US011299651B2

(12) United States Patent
Barnes et al.

(10) Patent No.: US 11,299,651 B2
(45) Date of Patent: Apr. 12, 2022

(54) TOUGHENED CYANOACRYLATE COMPOSITIONS

(71) Applicant: HENKEL IP & HOLDING GMBH, Duesseldorf (DE)

(72) Inventors: Rory R. Barnes, Dublin (IE); Raymond Tully, Meath (IE); Barry Burns, Dublin (IE)

(73) Assignee: Henkel AG & Co. KGaA, Duesseldorf (DE)

(*) Notice: Subject to any disclaimer, the term of this patent is extended or adjusted under 35 U.S.C. 154(b) by 79 days.

(21) Appl. No.: 16/841,583

(22) Filed: Apr. 6, 2020

(65) Prior Publication Data

US 2020/0239618 A1 Jul. 30, 2020

Related U.S. Application Data

(63) Continuation of application No. PCT/EP2018/076749, filed on Oct. 2, 2018.

(30) Foreign Application Priority Data

Oct. 6, 2017 (GB) ..................................... 1716412

(51) Int. Cl.
*C09J 4/06* (2006.01)
*C08K 3/014* (2018.01)
(Continued)

(52) U.S. Cl.
CPC ............. *C09J 4/06* (2013.01); *C08F 222/322* (2020.02); *C08G 18/3221* (2013.01);
(Continued)

(58) Field of Classification Search
CPC .. C08G 18/3221; C08G 18/341; C08G 18/73; C08G 18/753; C08G 18/758;
(Continued)

(56) References Cited

U.S. PATENT DOCUMENTS 4,440,910 A * 4/1984 O'Connor ................. C09J 4/06
525/295
5,340,873 A 8/1994 Mitry
(Continued)

FOREIGN PATENT DOCUMENTS

EP 1932863 A2 6/2008
EP 2121777 B1 4/2011
(Continued)

OTHER PUBLICATIONS

Coover, H.V. et al. "Cyanoacrylate Adhesives" in Handbook of Adhesives, 27, pp. 463-477, I. Skeist, ed., Van Nostrand Reinhold, New York, 3rd ed.

(Continued)

*Primary Examiner* — Andrew J. Oyer
(74) *Attorney, Agent, or Firm* — Steven C. Bauman

(57) ABSTRACT

Curable cyanoacrylate compositions are reported that comprise cyanoacrylate and a thermoplastic polyurethane (TPU) components. Such compositions are toughened cyanoacrylate compositions exhibiting long term viscosity stability when stored for prolonged periods at room temperature (25° C.). TPU components are reported having structural units in which at least one of the structural units has the formula —O—$R^1$—O—Ar—O—$R^2$—O—, wherein Ar is a $C_6$-$C_{20}$ aromatic group with at least one aromatic ring; $R^1$ is a $C_2$-$C_{10}$ alkyl group; and $R^2$ is a $C_2$-$C_{10}$ alkyl group. The thermoplastic polyurethane (TPU) component may be present in the curable cyanoacrylate composition from about 1 wt % to about 40 wt %, for example from about 2 wt % to about 30 wt %, such from about 3 wt % to about 20 wt %, suitably from about 5 wt % to about 10 wt %, based on the total weight of the composition.

24 Claims, 6 Drawing Sheets

(51) Int. Cl.
*C08G 18/32* (2006.01)
*C08G 18/34* (2006.01)
*C08G 18/73* (2006.01)
*C08G 18/75* (2006.01)
*C08G 18/76* (2006.01)
*C08K 5/00* (2006.01)
*C08K 5/12* (2006.01)
*C08K 5/315* (2006.01)
*C08F 222/32* (2006.01)

(52) U.S. Cl.
CPC .......... *C08G 18/341* (2013.01); *C08G 18/73* (2013.01); *C08G 18/753* (2013.01); *C08G 18/758* (2013.01); *C08G 18/765* (2013.01); *C08G 18/7621* (2013.01); *C08G 18/7664* (2013.01); *C08K 3/014* (2018.01); *C08K 5/005* (2013.01); *C08K 5/12* (2013.01); *C08K 5/315* (2013.01); *C08F 222/328* (2020.02)

(58) Field of Classification Search
CPC .............. C08G 18/7621; C08G 18/765; C08G 18/7664; C08G 18/4887; C08G 18/751; C08G 18/755; C08G 18/7614; C08G 18/7642; C08G 18/7671; C08G 18/7678; C08G 18/7685; C08G 18/4277; C08G 18/44; C08G 18/4238; C08G 18/3215; C08K 3/014; C08K 5/005; C08K 5/12; C08K 5/315; C08F 222/322; C08F 222/328; C08F 222/32; C09J 4/06; C09J 151/00; C09J 9/005; C09J 133/14; C09J 175/04
See application file for complete search history.

(56) References Cited

U.S. PATENT DOCUMENTS

| | | | |
|---|---|---|---|
| 5,658,850 | A | 8/1997 | Taniguchi et al. |
| 6,833,196 | B1 | 12/2004 | Wojciak |
| 7,687,561 | B1 | 3/2010 | Misiak |
| 2009/0104449 | A1 | 4/2009 | Farah et al. |

FOREIGN PATENT DOCUMENTS

| | | |
|---|---|---|
| JP | 62-81468 A | 4/1987 |
| JP | 62-199688 A | 9/1987 |
| JP | 2003-199191 A | 7/2003 |
| JP | 2011-057733 A | 3/2011 |
| WO | 2010/029134 A1 | 3/2010 |

OTHER PUBLICATIONS

Millet, G. H. "Cyanoacrylate Adhesives" in Structual Adhesives: Chemistry and Technology, S.R. Hartshorn, ed., Plenum Press, New York, pp. 249-307 (1986).

Zha, Liusheng et al. "Hydrogen bonding and morphological structure of segmented polyurethanes based on hydroquinone-bis(β-hydroxyethy)ether as a chain extender" Journal of Applied Polymer Science, vol. 73, issue 14, pp. 2895-2902 (1999).

Xin Liu et al. "Synthesis and properties of segmented polyurethanes with hydroquinone ether derivatives as chain extender" Journal of Polymer Research, vol. 22, issue 149 (2015).

www.inhanceproducts.com/technology.html, Jun. 20, 2017.

* cited by examiner

TOUGHENED CYANOACRYLATE COMPOSITIONS

BACKGROUND

Field

The present invention relates to toughened cyanoacrylate compositions.

BRIEF DESCRIPTION OF RELATED TECHNOLOGY

Cyanoacrylate adhesive compositions are well known, and widely used as quick setting, instant adhesives with a wide variety of uses. See H. V. Coover, D. W. Dreifus and J. T. O'Connor, "Cyanoacrylate Adhesives" in *Handbook of Adhesives*, 27, 463-77, I. Skeist, ed., Van Nostrand Reinhold, N.Y., 3$^{rd}$ ed. (1990). See also G. H. Millet "Cyanoacrylate Adhesives" in *Structural Adhesives: Chemistry and Technology*, S. R. Hartshorn, ed., Plenum Press, New York, p. 249-307 (1986).

Various techniques have been used to improve the adhesive properties of cyanoacrylate compositions, for example to improve bond strength, fixture speed, toughness of bond, thickness of composition, composition colour etc. Generally, the incorporation of additives, has been used to impart these improved properties in the end user product.

One of the primary shortcomings of liquid cyanoacrylate compositions has been their brittleness after cure.

In U.S. Pat. No. 4,440,910 to O'Connor et al. rubber toughened cyanoacrylate compositions are disclosed, wherein certain organic polymers, that are elastomeric (rubbery) in nature were found to impart toughening properties. The '910 patent is thus directed to and claims a curable adhesive comprising a substantially solvent-free mixture of: (a) cyanoacrylate ester, and (b) about 0.5% to about 20% by weight of an elastomeric polymer; wherein the elastomeric polymer is selected from elastomeric copolymers of a lower alkene monomer and (i) acrylic acid esters, (ii) methacrylic acid esters or (iii) vinyl acetate. More specifically, the '910 patent notes that acrylic rubbers, polyester urethanes, ethylene-vinyl acetates, fluorinated rubbers, isoprene-acrylonitrile polymers, chlorosulfonated polyethylenes, and homopolymers of polyvinyl acetate were found to be particularly useful as toughening additives for cyanoacrylates.

The cyanoacrylate compositions described by O'Connor et al were found to exhibit substantially increased toughness in comparison with control samples and the adhesive bonds formed therewith were also found to have excellent resistance to thermal degradation.

The acrylic rubbers disclosed by O'Connor et al which impart favourable toughening properties in cyanoacrylate adhesive compositions include: homopolymers of alkyl esters of acrylic acid; copolymers of another polymerizable monomer, such as lower alkenes, with an alkyl or alkoxy ester of acrylic acid; and copolymers of alkyl or alkoxy esters of acrylic acid. Other unsaturated monomers which may be copolymerized with the alkyl and alkoxy esters of acrylic acid, include dienes, reactive halogen-containing unsaturated compounds and other acrylic monomers such as acrylamides.

U.S. Pat. No. 5,340,873 describes a cyanoacrylate composition comprising a high molecular weight polyester polymer which provides improved impact resistance and enhanced toughness and flexibility.

U.S. Pat. No. 6,833,196 discloses a cyanoacrylate adhesive composition including an acrylic monomer toughening agent that has reduced acid generation, enhanced toughness and faster fixture speeds.

U.S. Pat. No. 7,687,561 (Misiak) describes toughened cyanoacrylate compositions based on utilising a polyketone material of a defined structural formula to toughen the composition. A large group of co-tougheners to be used in conjunction with the polyketone materials are also mentioned among which polyester urethanes are mentioned as possible co-tougheners.

Japanese Patent Publication JP201157733 relates to a cyanoacrylate composition which has high shear adhesion strength, high peel strength and high impact strength; the composition comprises a cyanoacrylate component, a thermoplastic urethane elastomer component and a fumed silica component. JP201157733 provides an adhesive composition comprising cyanoacrylate compositions comprising varying types of TPU elastomer, fumed silica, radical polymerisation inhibitors, and/or plasticisers.

Japanese Patent Publication JP2003199191 discloses a quick-setting adhesive composition comprising 2-cyanoethylacrylate, polyurethane rubber, pyrogallol, polyethylene glycol (or a derivative thereof) and tricresyl phosphate. The adhesive of JP2003199191 is for use in assembling magnetic circuit components of electroacoustic transduction devices and the urethane rubber may be a thermoplastic urethane rubber.

Japanese Patent Publication JPS62081468 relates a composition comprising an α-cyanoacrylate, pyrogallol, and a urethane rubber (1-50 wt %). In the examples in JPS62081468, iron rubber (product name of urethane unvulcanized rubber manufactured by NOK, Inc. in Japan) is disclosed as a preferred urethane rubber.

JP62199668 discloses an adhesive composition comprising an α-cyanoacrylate, pyrogallol, urethane rubber and trimethyl borate, wherein the urethane rubber may be a thermoplastic urethane rubber. The composition is described as exhibiting excellent bond strength including tensile shear strength, peel strength, and impact strength, but in addition said composition has improved storage performance. Prior art compositions comprising cyanoacrylate, pyrogallol and urethane rubber were known to have poor storage stability and this is reported as being the result of degradation/ hydrolysis of the urethane rubber in said compositions. The improvement in storage stability is attributed to the presence of the trimethyl borate in the compositions disclosed therein.

One group of elastomeric polymers that have demonstrated utility as tougheners in cyanoacrylate compositions is a group of copolymers of methyl acrylate and ethylene, manufactured by DuPont® under the tradename VAMAC™, such as VAMAC™ N123 and VAMAC™ B-124.

Henkel Corporation (as the successor to Loctite Corporation) has sold for a number of years since the filing of the '910 patent rubber toughened cyanoacrylate adhesive products under the trade name BLACK MAX®, which employ as the rubber toughening component the DuPont® materials called VAMAC™ B-124 and N123. In addition, Henkel previously sold clear and substantially colourless rubber toughened cyanoacrylate adhesive products, namely, LOCTITE® 4203, 4204, 4205 and 435, which employ as the rubber toughening component the DuPont® material, VAMAC™ G and VAMAC™ MR.

VAMAC™ VCS rubber appears to be the base rubber, from which the remaining members of the VAMAC™ product line are compounded. VAMAC™ VCS is a reaction product of the combination of ethylene, methyl acrylate and monomers having carboxylic acid cure sites, which once formed is then substantially free of processing aids such as the release agents octadecyl amine, complex organic phosphate esters and/or stearic acid, and anti-oxidants, such as substituted diphenyl amine.

European Patent Publication No. EP2121777 discloses a method of improving the toughness of cyanoacrylate compositions comprising graphite platelet material and rubber tougheners. The incorporation of the graphite component provides a cyanoacrylate adhesive composition with enhanced physical properties, including improved shear and peel strength, fracture toughness and environmental resistance.

Cyanoacrylate adhesives materials offer many advantages over other adhesives materials such as rapid curing, the ability to bond to multiple substrates, and very good tensile strengths. However, as mentioned above cyanoacrylate adhesives materials often suffer from brittleness one cured. They can show poorer resistance to impact, to increased temperature and to moisture as compared to other adhesives.

Cured cyanoacrylate adhesives are known to have poorer shatter-resistance. Moreover, their tensile strength can drop dramatically at elevated temperatures.

As set out above, it is known to toughen cyanoacrylate adhesives. Only a few substances are known to be useful for imparting toughness to cured cyanoacrylate adhesives compositions, which compositions are otherwise brittle once cured. There are several reasons for this lack of suitable toughening agents. Cyanoacrylates are inherently chemically reactive, and therefore many substance can destabilise cyanoacrylates, leading to inappropriate polymerisation, substantially reducing storage stability of the curable product, or leading to the formation of reaction products which degrade the ability to use the composition for example, as an effective adhesives material. Similarly, materials that are not soluble, or are poorly soluble in ECA (ethyl cyanoacrylate) or MeOCA (methoxy cyanoacrylate) for example, are not well suited for use as toughening agents in these cyanoacrylates. It can be challenging to identify substances that are both soluble in cyanoacrylate and that do not destabilise the cyanoacrylate. Certain elastomeric materials although soluble in cyanoacrylate either phase separate over time, are unstable, or do not confer any toughness to the composition. Some materials that confer toughness in cyanoacrylate compositions have a destabilizing effect.

The use of toughening agents in cyanoacrylate compositions can lead to a gradual but highly significant drop in the viscosity of the cyanoacrylate compositions when stored at room-temperature (25° C.). Such unstable viscosity is undesirable.

The use of HQEE as a chain extender in polyurethane compositions has been disclosed for example in "Hydrogen bonding and morphological structure of segmented polyurethanes based on hydroquinone-bis (β-hydroxyethyl)ether as a chain extender" (1999), Journal of Applied Polymer Science, Volume 72, Issue 14. The entire contents of this publication are hereby incorporated herein by reference.

Similarly, a series of polyurethane materials obtained from hydroquinone ether derivatives, wherein these derivatives are used as chain extenders, are disclosed for example in "Synthesis and properties of segmented polyurethanes with hydroquinone ether derivatives as chain extender" (2015), Journal of Polymer Research, Volume 22, Issue 149. The entire contents of this publication are hereby incorporated herein by reference.

Furthermore, it is very well known that cyanoacrylates, such as for example curable cyanoacrylate components that are liquid at room temperature, are usually poor solvents for many materials. Consequently, solubility issues rule out many components that might otherwise be useful as toughening agents.

Notwithstanding the foregoing it is desirable to provide cyanoacrylate compositions that are toughened, yet are storage stable and exhibit good bond strengths.

SUMMARY

In one aspect, the present invention provides a curable cyanoacrylate composition comprising:
(i) a cyanoacrylate; and
(ii) a thermoplastic polyurethane (TPU) having a chain formed from structural units;
wherein at least one of the structural units of the chain of the thermoplastic polyurethane (ii) has the formula:

$$-O-R^1-O-Ar-O-R^2-O-,$$

wherein:
Ar is a $C_6$-$C_{20}$ aromatic group with at least one aromatic ring;
$R^1$ is a $C_2$-$C_{10}$ alkyl group; and
$R^2$ is a $C_2$-$C_{10}$ alkyl group,
and wherein the thermoplastic polyurethane (TPU) (ii) is present in the curable cyanoacrylate composition from about 1 wt % to about 40 wt %, for example from about 2 wt % to about 30 wt %, such from about 3 wt % to about 20 wt %, suitably from about 5 wt % to about 10 wt %, based on the total weight of the composition.

Advantageously, such compositions exhibit long term viscosity stability (i.e. for at least 30 days) when stored at room temperature (25° C.), while still retaining good bond strength as measured by T peel tests. As used herein, compositions exhibiting 'viscosity stability' (or a 'stable viscosity') are those for which the viscosity measured after 30 days storage (as measured at a temperature of 25° C.) does not decrease relative to the initial viscosity measured at 'T=0', or decreases by no more than 5%. T=0 refers to the time immediately after formulation of a composition.

Advantageously, such compositions also exhibit reversible changes in viscosity as a function of temperature, which affords such compositions with resistance to heat-cycling.

The aromatic group Ar in the structural unit with the formula:

$$-O-R^1-O-Ar-O-R^2-O-$$

may be selected from: benzene, methyl benzene, dimethylbenzene, ethylbenzene, trimethylbenzene, tetramethylbenzene, diethylbenzene, triethylbenzene, naphthalene, methylnaphthalene, dimethylnaphthalene, trimethylnaphthalene, tetraethylbenzene, tetramethylnaphthalene, pentamethylnaphtalene, hexamethylnaphthalene, ethylnaphthalene, diethylnaphthalene, or triethylnaphthalene.

The aromatic group Ar in the structural unit with the formula:

$$-O-R^1-O-Ar-O-R^2-O-$$

may be a benzene group or a naphthalene group. At least one of the alkyl groups $R^1$ and $R^2$ in the structural unit with the formula:

$$-O-R^1-O-Ar-O-R^2-O-$$

may be a $C_2$ alkyl group. Suitably, the alkyl groups $R^1$ and $R^2$ in the structural unit with the formula:

$$-O-R^1-O-Ar-O-R^2-O-$$

are both $C_2$ alkyl groups.

For example, Ar may be a $C_6$ aromatic group such as a benzene group, and the alkyl groups $R^1$ and $R^2$ may both be $C_2$ alkyl groups in the structural unit with the formula:

—O—$R^1$—O—Ar—O—$R^2$—O—.

The structural unit with said formula can be formed from hydroquinone bis(2-hydroxyethyl) ether (HQEE).

In a curable cyanoacrylate composition of the invention, the structural unit with the formula:

—O—$R^1$—O—Ar—O—$R^2$—O— may be present in the thermoplastic polyurethane (TPU) (ii) in an amount from about 0.5 wt % to about 50 wt %, such as from about 1 wt % to about 20 wt %, for example from about 5 wt % to about 10 wt % based on the total weight of the thermoplastic polyurethane (ii).

The thermoplastic polyurethane (TPU) toughening agent can be prepared using a polyol selected from the group comprising a polyester-polyol, a co-polyester-polyol, a polyether-polyol, a co-polyether-polyol, a polycaprolactone-polyol, and/or a co-polycaprolactone-polyol. Suitably, the polyol used in the preparation of the thermoplastic polyurethane (TPU) (ii) is a polyester-polyol or a co-polyester-polyol. The polyol used in the preparation of the thermoplastic polyurethane (TPU) (ii) may be a co-polyester formed from a dicarboxylic acid and 1,6-hexanediol. For example the polyol used in the preparation of the thermoplastic polyurethane (TPU) (ii) may be a linear polyester-polyol formed from a dicarboxylic acid and 1,6-hexanediol, wherein the linear polyester-polyol has a hydroxyl number of from about 1 to about 60 mg KOH/g, for example from about 16 to about 54 mg KOH/g, such as from about 27 to 34 mg KOH/g, as measured according to ASTM E222.

The cyanoacrylate component (i) of said curable cyanoacrylate composition may be selected for example from the group comprising ethyl 2-cyanoacrylate and β-methoxy cyanoacrylate.

The cyanoacrylate component may be present in an amount of about 50 wt % to about 99 wt % based on the total weight of the cyanoacrylate composition. Suitably, the cyanoacrylate component is present in an amount of about 60 wt % to about 90 wt % based on the total weight of the cyanoacrylate composition.

Suitably, the thermoplastic polyurethane is present in an amount of about 1 wt % to about 40 wt % based on the total weight of the cyanoacrylate composition, such as from about 5 wt % to about 20 wt % based on the total weight of the cyanoacrylate composition.

Curable cyanoacrylate compositions according to the invention can further comprise a stabiliser, such as for example a 'Lewis acid stabiliser' or a 'Brønsted acid stabiliser' in an amount from about 0.0005 wt % to about 5 wt % based on the total weight of the cyanoacrylate composition. For example, a stabiliser can be boron trifluoride ($BF_3$), sulfur dioxide ($SO_2$), or hydrogen fluoride (HF). The term 'stabiliser' refers to a substance that stabilises the cyanoacrylate component, for example, by inhibiting premature polymerisation of the cyanoacrylate composition.

Optionally, a curable cyanoacrylate composition of the present invention may further comprise ultra-high molecular weight polyethylene in an amount from about 0.05 wt % to about 5 wt % based on the total weight of the cyanoacrylate composition. As used herein 'ultra-high molecular weight polyethylene' refers to polyethylene with a molecular weight of 3,000,000-5,000,000 g/mol. Such an optional ultra-high molecular weight polyethylene component may be in the form of microparticles, or surface modified microparticles. By way of non-limiting example, one such optional component is INHANCE® UH-1250 ('UH-1250'), which comprises surface modified microparticles of ultra-high molecular weight polyethylene having an average size of 53 μm. By way of non-limiting example, one such optional component is INHANCE® UH-1080 ('UH-1080'), which comprises surface modified microparticles of ultra-high molecular weight polyethylene having an average size of 125 μm.

The present invention provides curable cyanoacrylate compositions wherein the viscosity of the uncured composition 25° C. does not decrease by more than 5% from the starting viscosity over 30 days when stored at 25° C.

Optionally, a curable cyanoacrylate composition of the present invention may further comprise an antioxidant at an amount from about 0.01 wt % to about 1 wt %, such from about 0.1 wt % to about 0.8 wt %, such as from about 0.2 wt % to about 0.5 wt % by weight based on the total weight of the composition. By way of non-limiting example, such an antioxidant may be Irganox 1010. Irganox is a registered trademark; Irganox 1010 is pentaerythritol tetrakis(3-(3,5-di-tert-butyl-4-hydroxyphenyl)propionate).

The present invention provides a method of preparing a curable cyanoacrylate composition that retains a stable viscosity for at least 30 days at 25° C., wherein the method involves preparing a formulation comprising from about 60 wt % to about 90 wt % of a cyanoacrylate with from about 1 wt % to about 40 wt % of a TPU, wherein the percentages are by weight based on the total weight of the composition and wherein the TPU has been prepared from:

a polyol selected from the group comprising a polyester-polyol, a co-polyester-polyol, a polyether-polyol, a co-polyether-polyol, a polycaprolactone-polyol, and a co-polycaprolactone-polyol; and an isocyanate compound selected from the group comprising 1,4-diisocyanatobenzene (PPDI), toluene diisocyanate (TDI), 4,4'-diphenylmethane diisocyanate (4,4'-MDI), 2,4'-diphenylmethane diisocyanate (2,4'-MDI), polymethylene poly(phenyl isocyanate) (PMDI), 1,5-naphthalene diisocyanate (NDI), bitolylene diisocyanate (TODI), 1,3-xylene diisocyanate (XDI), p-1,1,4,4-tetramethylxylene diisocyanate (p-TMXI), m-1,3,3-tetramethylxylylene diisocyanate (m-TMXDI), 1,6-diisocyanato-2,4,4-trimethylhexane, 1,4-cyclohexane diisocyanate (CHDI), 1,4-cyclohexanebis(methylene isocyanate) (BDI), 1,3-bis(isocyanatomethyl)cyclohexane (H6XDI), 3-isocyanatomethyl-3,5,5-trimethylcyclohexyl isocyanate (IPDI), dicyclohexylmethane diisocyanate (H12MDI), triphenylmethane-4,4',4"-triisocyanate; and a chain extender with the formula:

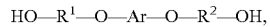
HO—$R^1$—O—Ar—O—$R^2$—OH, wherein Ar is a $C_6$-$C_{20}$ aromatic group with at least one ring, $R^1$ is a $C_2$-$C_{10}$ alkyl group, and $R^2$ is a $C_2$-$C_{10}$ alkyl group.

In said method, the chain extender with the formula:

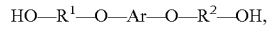
HO—$R^1$—O—Ar—O—$R^2$—OH, may be hydroquinone bis(2-hydroxyethyl) ether (HQEE).

DETAILED DESCRIPTION

The present invention relates to the use of TPU materials as toughening agent for cyanoacrylate adhesives compositions, wherein a chain extender is used in the synthesis of the TPU; wherein the chain extender desirably has the formula HO—R$^1$—O—Ar—O—R$^2$—OH, wherein Ar is a C$_6$-C$_{20}$ aromatic group with at least one ring, R$^1$ is a C$_2$-C$_{10}$ alkyl group, and R$^2$ is a C$_2$-C$_{10}$ alkyl group. It will be appreciated that R$^1$ and R$^2$ may be the same or different. By way of example, one such suitable chain extender is hydroquinone bis(2-hydroxyethyl) ether (See 'Structure 1', below). ['HQEE' is an abbreviation for hydroquinone bis(2-hydroxyethyl) ether.] The International Union of Pure and Applied Chemistry (IUPAC) name for HQEE is: 2,2'-[1,4-phenylenebis(oxy)]diethanol. The structural unit —O—R$^1$—O—Ar—O—R$^2$—O— may be considered a chain extender.

Hydroquinone bis(2-ethyl)ether (HQEE) is a chain extender commonly used in the manufacture and production of TPU type materials (Structure 1). Without intending to be bound by any theorem, it is believed that HQEE has the effect of increasing the interaction of H-bonding sites within the TPU into which it becomes incorporated, based on its greater stiffness and insolubility in the amorphous region of the TPU, leading to better phase segregation of HQEE hard segments (Structure 1) within TPUs based on HQEE, as compared with the corresponding TPU in which 1,4-butanediol (BDO; Structure 2) is used as a chain extender.

When structurally incorporated into the TPU the chain extender as described above forms a structural unit with the chemical formula—

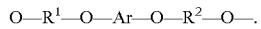

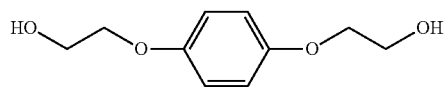

Chain extender; Structure 1: Hydroquinone bis(2-ethyl) ether; (HQEE)

Chain extender; Structure 2: 1,4-Butanediol (BDO)

The use of TPUs as toughening agents for cyanoacrylate compositions based on chain extenders such as for example HQEE (structure 1, above), or other chain extenders described by the chemical formula H—O—R$^1$—O—Ar—O—R$^2$—O—H, as toughening agents for cyanoacrylate compositions confers long-term viscosity stability (for at least 30 days at 25° C.) on curable cyanoacrylate compositions and improved long-term performance (≥30 days) over a range of metrics, for example tensile strength of the subsequently cured composition. In the present invention, HQEE may be used as a chain extender for the synthesis of TPUs. The use of such TPUs as toughening agents for cyanoacrylate compositions imparts long-term (≥30 days) viscosity stability at room-temperature (25° C.) on the resulting compositions.

The use of TPU materials as toughening agents in cyanoacrylate compositions can lead to a gradual but highly significant drop in the viscosity of the cyanoacrylate compositions when said compositions are stored at room-temperature (25° C.) (See FIGS. 1 and 4). This drop in viscosity is more rapidly detected when thermally accelerated aging is applied to the compositions. Surprisingly, the curable cyanoacrylate compositions toughened with TPU materials according to the present invention do not demonstrate such a drop in viscosity when stored for 30 days at room temperature (25° C.).

The TPU materials used as toughening agents for the curable cyanoacrylate compositions according to the present invention are a group of materials that offer an alternative means of imparting toughness to cyanoacrylate adhesives materials, i.e. to reduce the brittleness of the cured composition. TPUs offer an alternative to PE/PMA copolymer-based toughening agents such as Vamac™ from DuPont®.

The TPUs used in the present invention are quite soluble in cyanoacrylates and are generally chemically stable in cyanoacrylate-based compositions.

The TPUs used in the present invention can be prepared by techniques well-known in the art to be of high purity. As used herein, the term 'Example TPU' refers to a TPU that is present in one of the Example Compositions. As used herein, the term 'Comparative Example TPU' refers to a TPU that is present in one of the Comparative Example Compositions.

Thermoplastic polyurethanes (TPUs) are typically multi-block copolymers with hard and soft segments that can be produced by a poly addition reaction of an isocyanate with a linear polymer polyol and a low molecular weight diol as a chain extender. The soft segments form an elastomer matrix thereby affording the polymer elastic properties. The hard segments typically act as multifunctional tie points that function both as physical crosslinks and reinforcing fillers. As used herein the term "chain extender" is to be understood as a component used in the synthesis of a TPU, and that becomes structurally incorporated into the TPU, and which is distinct from the polyol component, and which is also distinct from the isocyanate component. A TPU 'based on' a certain chain extender (for example an "HQEE-based TPU", or for example a "BDO-based TPU") is one in which said chain extender has been used in the synthesis of said TPU, or in which said chain extender forms a structural unit in said TPU.

The use of certain TPU materials, such for example as those based on butanediol chain extender (Structure 2), as toughening agents in cyanoacrylate compositions generally leads to a gradual but highly significant drop in the viscosity of the cyanoacrylate compositions when stored at room-temperature (25° C.). And this drop in viscosity is more rapid when thermally accelerating aging is applied to the compositions. Such a drop in viscosity is undesirable in itself, and it can be further associated with decreased performance in other properties such as tensile strength, for example as measured using T-peel tests under standard procedure ASTM-710/ISO 11339. This undesirable drop in viscosity at room temperature (25° C.) that is encountered when TPUs have been tested as toughening agents in cyanoacrylate compositions has previously discouraged further development and commercialisation of this technology in the field.

The present invention relates to the use of certain TPU materials as toughening agent for cyanoacrylate adhesives compositions, wherein a chain extender is used in the synthesis of the TPU, resulting the TPU having a structural unit with the formula —O—R$^1$—O—Ar—O—R$^2$—O—, wherein Ar is a C$_6$-C$_{20}$ aromatic group with at least one ring, R$^1$ is a C$_2$-C$_{10}$ alkyl group, and R$^2$ is a C$_2$-C$_{10}$ alkyl group. By way of example, one such suitable chain extender is hydroquinone bis(2-hydroxyethyl) ether. 'HQEE' is an abbreviation for hydroquinone bis(2-hydroxyethyl) ether. Using International Union of Pure and Applied Chemistry (IUPAC) nomenclature, the name for HQEE is: 2,2'-[1,4-phenylenebis(oxy)]diethanol.

The TPU materials suitable for use in the invention are composed of at least three structural units. Said structural units may come from three components: (1) polyol, (2) compound bearing two or more isocyanate groups, such as methylene diphenyl diisocyanate (MDI), and (3) a low molecular weight chain extender, for example a diol.

In this context, polyurethanes are formed by the reaction of isocyanate groups with the alcohol groups on the other components. Chain extenders can include, for example short-chain diols or less frequently oligomeric diols. Chain extenders typically used in TPUs and known in the art include for example 1,4-butanediol, or triols that facilitate crosslinking of the TPU network. TPU materials have been prepared and tested for their ability and performance as toughening agents for cyanoacrylate adhesives compositions. TPUs were prepared using several chain extenders, such as 1,3-propanediol, 1,4-butanediol, 1,8-octanediol and 1,12-dodecanediol, and all of these TPUs were tested as toughening agents in cyanoacrylate compositions; however, none of the TPUs prepared using the above mentioned chain extenders were able to impart long-term (≥30 days) viscosity stability together with the required toughness on cyanoacrylate compositions at 25° C.

The compositions of the invention exhibit long-term viscosity stability (for example, for at least 1 month) at room-temperature (25° C.). The compositions according to the invention also exhibit good tensile strengths on a range of materials and good T peel strengths both when cured at room temperature and when cured at 90° C. The present invention thus provides cyanoacrylate compositions that have long-term stability of viscosity at room temperature (25° C.).

The compositions of the present invention also exhibit reversible changes in viscosity as a function of temperature, which advantageously affords the composition with resistance to heat-cycling.

Suitable polyols include those with at least at least two hydroxyl (OH) groups in their structure. The polyols may additionally have other groups such as ester, ether, carbonate, carboxylic acid, amido, cyano, hemiacetal or halogen. A suitable polyol can be a polyester polyol. Polyether polyols are also suitable polyols. Polycarbonate polyols are also suitable. Examples of suitable polyols include highly or partly crystalline polyesters or co-polyesters; for example, Dynacoll 7360. Dynacoll 7360 is a partly crystalline copolyester based on adipic acid (hexane-1,6-dioic acid) and 1,6-hexanediol with a hydroxyl value of 27 to 34 mg KOH/g (as measured under standard procedure DIN 53240), an acid value of <2 mg KOH/g (as measured under standard procedure DIN 53402), a melting point of 60° C. (as measured by differential scanning calorimetry), a softening point of 65° C. (measured by ring and ball instrument according to standard procedure ISO 4625), a viscosity of about 2,000 mPa·s at 80° C. (as measured using a Brookfield LVT 4 viscometer) and a molecular weight (from the hydroxyl value) of about 3,500.

Another suitable polyester polyol for example, is Dynacoll 7380 which is a polyester of dodecanedioic acid and 1,6-hexanediol with an OH number from about 27 to about 34. Suitable polyester polyols for example can comprise a polyester of a dicarboxylic acid with 1,6-hexanediol. Further examples of other suitable polyols include for example the solid partly/highly crystalline co-polyesters Dynacoll 7361, 7363, and 7390. Dynacoll 7000-series polyols are commercially available from Evonik. Further examples of suitable polyols include linear polyether glycols terminated with primary hydroxyl groups, for example polycaprolactone terminated with hydroxyls, for example polycaprolactone-block-polytetrahydrofuran-block-polycaprolactones terminated with hydroxyls, such as for example Terathane 2000 PTMEG. Further examples of suitable polyols include solid or semi-solid highly crystalline co-polyesters, such as linear polyester diols derived from caprolactone monomers terminated by primary hydroxyl groups, such as Capa 2201 commercially available from Perstorp. Dynacoll, Capa and Terathane are registered trademarks.

Polyesters suitable for the formation of polymer polyols are, for example, predominantly linear polymers containing terminal OH groups (polyester polyols), such as those containing two or three, more particularly two, terminal OH groups. The acid value of such polyester polyols is generally below about 10 and for example below about 3. Polyesters with a molecular weight of ca. 1,000 to ca. 50,000, for example ca. 2,000 to ca. 15,000 or ca. 2,500 to ca. 5,000, are suitable for use as polymer polyols in accordance with the invention. For example, polyesters obtained by reaction of low molecular weight alcohols, more particularly linear or branched, saturated or unsaturated, aliphatic or aromatic glycols, may be used. Examples of such alcohols are diethylene glycol, ethane-1,2-diol, propane-1,3-diol, 2-methyl-propane-1,3-diol, butane-1,4-diol, pentane-1,5-diol, hexane-1,6-diol, heptane-1,7-diol, octane-1,8-diol, nonane-1,9-diol, decane-1,10-diol and the corresponding higher homologs obtained by step-by-step extension of the carbon chain of the compounds mentioned and, for example, 2,2,4-trimethyl-pentane-1,5-diol, 2,2-dimethylpropane-1,3-diol, 1,4-dimethylol cyclohexane, 1,4-diethanol cyclohexane, 2-methyl-2-butylpropane-1,3-diol, 2,2-dimethylbutane-1,4-diol, 1,4-dimethylol cyclohexane, hydroxypivalic acid neopentyl glycol ester, diethylene glycol, triethylene glycol, methyl diethanolamine or aromatic-aliphatic or aromatic-cycloaliphatic diols containing 8 to ca. 30 carbon atoms, heterocyclic ring systems or isocyclic ring systems, such as naphthalene or, more particularly, benzene derivatives, such as bisphenol A, being usable as aromatic structures, 2× symmetrically ethoxylated bisphenol A, 2× symmetrically propoxylated bisphenol A, more highly ethoxylated or propoxylated bisphenol A derivatives or bisphenol F derivatives, the hydrogenation products of the bisphenol A and bisphenol F derivatives mentioned or the products of the corresponding reaction of a compound or a mixture of two or more of the compounds mentioned with an alkylene oxide containing 2 to about 8 carbon atoms or a mixture of two or more such alkylene oxides.

Suitable polyester polyols can be obtained, for example, by polycondensation. Thus, dihydric or trihydric alcohols or a mixture of two or more thereof may be condensed with dicarboxylic acids or tricarboxylic acids or a mixture of two or more thereof or reactive derivatives thereof to form polyester polyols. Suitable dicarboxylic acids are, for example, succinic acid and higher homologs thereof containing up to 44 carbon atoms, unsaturated dicarboxylic acids, such as maleic acid or fumaric acid, and aromatic dicarboxylic acids, particularly the isomeric phthalic acids, such as phthalic acid, isophthalic acid or terephthalic acid. Suitable tricarboxylic acids are, for example, citric acid or trimellitic acid. Polyester polyols of at least one of the dicarboxylic acids mentioned and glycerol which have a residual OH group content are particularly suitable for the purposes of the invention. Particularly suitable alcohols are hexanediol, ethylene glycol, diethylene glycol or neopentyl glycol or mixtures of two or more thereof. Particularly suitable acids are phthalic acid, isophthalic acid, terephthalic acid or adipic acid and mixtures thereof.

Other polyols suitable as a polyol component for the production of the polyesters are, for example, diethylene glycol or higher polyethylene glycols with a molecular weight (Mn) of ca. 100 to ca. 22,000 for example ca. 200 to ca. 15,000 or ca. 300 to ca. 10,000, such as, ca. 500 to ca. 2,000.

Polyesters suitable as polymer polyols for the purposes of the invention include, in particular, the reaction products of polyhydric alcohols, such as dihydric alcohols (optionally together with small quantities of trihydric alcohols) and polybasic carboxylic acids, such as dibasic carboxylic acids. Instead of free polycarboxylic acids, the corresponding polycarboxylic anhydrides or corresponding polycarboxylic acid esters with alcohols containing for example 1 to 8 carbon atoms may also be used (where they exist). The polycarboxylic acids may be aliphatic, cycloaliphatic, aromatic and/or heterocyclic. They may optionally be substituted, for example by alkyl groups, alkenyl groups, ether groups or halogens. Suitable polycarboxylic acids are, for example, succinic acid, adipic acid, suberic acid, azelaic acid, sebacic acid, phthalic acid, isophthalic acid, terephthalic acid, trimellitic acid, phthalic anhydride, tetrahydrophthalic anhydride, hexahydrophthalic anhydride, tetrachlorophthalic anhydride, tetrabromophthalic anhydride, endomethylene tetrahydrophthalic anhydride, glutaric anhydride, maleic acid, maleic anhydride, fumaric acid, dimer fatty acid or trimer fatty acid or mixtures of two or more thereof. Small quantities of monofunctional fatty acids may optionally be present in the reaction mixture.

Corresponding polyesters may contain terminal carboxyl groups for example. Polyesters obtainable from lactones, for example ε-caprolactone, or hydroxycarboxylic acids, for example ω-hydroxycaproic acid, may also be at least partly used.

To produce the polyester polyols, it may be of advantage to use corresponding acid derivatives, such as carboxylic anhydrides or carboxylic acid chlorides, where they are available, instead of the dicarboxylic acids themselves.

Suitably, ethane-1,2-diol, propane-1,3-diol, 2-methylpropane-1, 3-diol, butane-1,4-diol, hexane-1,6-diol, 2,2-dimethylpropane-1,3-diol, 1,4-dimethylolcyclohexane, 1,4-diethanolcyclohexane and ethoxylated or propoxylated products of 2,2-bis-(4-hydroxyphenylene)-propane (bisphenol A) can be used for the production of the polyester polyols. Depending on the required properties of the polyisocyanate prepolymers provided with the corresponding polymer polyols, the polyester polyols mentioned may be used on their own or in the form of a mixture of two or more of the polyester polyols mentioned in various quantity ratios for the production of the polyisocyanate prepolymers. Suitable lactones for the production of the polyester polyols are, for example, dimethylpropiolactone, γ-butyrolactone or ε-caprolactone.

Polyether polyols are also suitable for use as polymer polyols in the production of TPUs. Polyether polyols are understood to be substantially linear compounds with ether bonds which contain terminal OH groups as defined in the foregoing text. Suitable polyether polyols may be produced, for example, by polymerization of cyclic ethers, such as ethylene oxide, propylene oxide, butylene oxide or tetrahydrofuran or by reaction of a mixture of two or more alkylene oxides containing 2 to 12 carbon atoms in the alkylene group with a starter molecule containing two active hydrogen atoms. Suitable alkylene oxides are, in particular, ethylene oxide, 1,2-propylene oxide, epichlorohydrin, 1,2-butylene oxide or 2,3-butylene oxide or mixtures of two or more thereof.

The polymerization of polyether polyols is generally carried out in the presence of a base as catalyst. Suitable polyether polyols can comprise, for example, polyalkylene glycols obtainable by polymerization of ethylene oxide or propylene oxide, optionally in admixture with $C_4$-$C_{12}$ alkylene oxides. Suitable polyether polyols can comprise, for example, polyethylene glycols containing $C_3$ or $C_4$ units, or both, which can be obtained by copolymerization of ethylene oxide with propylene oxide or butylene oxide or a mixture thereof. Polyethers obtainable by Co—Zn cyanide complex catalysis are also suitable.

Suitably, polyalkylene glycols obtained by addition of ethylene oxide and propylene oxide or mixtures thereof onto diols or triols containing primary, secondary or tertiary OH groups or mixtures of two or more such diols or triols as starter molecules can be used as polyether polyols. Basically, suitable starter molecules are water or any mono- or polyfunctional low molecular weight alcohols or mixtures thereof, although polyalkylene glycols produced using a dihydric or trihydric alcohols as polyols, for example ethylene glycol, propylene glycol, butylene glycol, pentanediol, hexanediol, heptanediol, octanediol and higher homologs thereof, neopentyl glycol, glycerol, trimethylol propane, triethylol propane, pentaerythritol, glucose, sorbitol, mannitol or a mixture of two or more thereof as starter molecule, are suitable.

Polyalkylene glycols may be used individually, i.e. as a polyaddition product with the molecular weight distributions typically formed in base-catalyzed additions of alkylene oxides onto water or other starter molecules. However, mixtures of different polyalkylene glycols with different molecular weight distributions may also be used for the production of the polyisocyanate prepolymers. Polyalkylene glycols formed by addition of only one alkylene oxide compound onto a starter molecule may also be used. However, polyalkylene glycols obtainable by addition of various alkylene oxides are also suitable. They may be both block copolymers and statistical copolymers.

Polymer polyols containing ether and ester groups which may be obtained by polycondensation of polycarboxylic acids with polyethers are also suitable as polymer polyols for the purposes of the invention. Basically, the above-mentioned polycarboxylic acids and polyethers are suitable for this purpose.

Polymer polyols containing ester and ether groups which may be obtained by ring opening of epoxidized oils, for example epoxidized soybean oil, with mono- or polyalcohols are also suitable as polymer polyols.

In the present invention, polyester polyols may be used as the polymer polyols in the preparation of the TPU toughening agent for the curable cyanoacrylate composition. Suitable polyester polyols have a molecular weight of at least ca. 500, such as at least ca. 1,000, for example ca. 1,500 to ca. 10,000 or ca. 2,000 to ca. 9,000. The above-described polyester polyols of the Dynacoll series marketed by Evonik, for example Dynacoll 7360/7361/7362/7380 are suitable for the purposes of the present invention. Polyether polyols (for example, polycaprolactones or $C_3$-$C_5$ alkylene oxides), and polycarbonate polyols are also suitable. Polyether polyols of the Lupranol series marketed by BASF, for example Lupranol 1000, or Voranol P 2000 of Dow Chemicals are suitable for the purposes of the invention.

Polycarbonates, for example, may also be used as polymer polyols in accordance with the invention. Suitable polycarbonates that may be used comprise, for example, substantially linear molecules containing at least two OH groups, for example terminal OH groups. Corresponding polycarbonate polyols are produced, for example, by reaction of one of the above-mentioned dihydric alcohols or a mixture of two or more such dihydric alcohols with phosgene.

Aliphatic alcohols, for example, containing three or more functional groups and 3 to ca. 15 carbon atoms, such as ca. 3 to ca. 10 carbon atoms, may also be used in the production of the polymer polyols in quantities of up to ca. 10% or ca. 5% by weight, based on the total weight of the polymer polyols present in the polyisocyanate prepolymers. Suitable such compounds are, for example, trimethylol propane, triethylol propane, glycerol, pentaerythritol, sorbitol, mannitol and other sugar alcohols containing up to ca. 10 OH groups per molecule. The corresponding derivatives of the compounds mentioned, which can be obtained by reaction with an alkylene oxide containing 2 to ca. 4 carbon atoms or a mixture of two or more such alkylene oxides, may also be used for the production of the polymer polyols. The compounds mentioned may be used individually or in the form of mixtures of two or more of the compounds mentioned.

Compounds from the above-mentioned classes suitable for use as polymer polyols may already be present in a molecular weight range suitable for use as a polymer polyol. However, compounds from the above-mentioned classes with a molecular weight below the molecular weight suitable for use as a polymer polyol or below the molecular weight required for the purposes of the invention may equally well be used for the production of polymer polyols. In this case, it is possible in accordance with the invention to extend such compounds from the above-mentioned classes by reaction with corresponding difunctional compounds until they acquire the necessary or desired molecular weight. Dicarboxylic acids, difunctional epoxy compounds or diisocyanates, for example, are suitable for this purpose. Diisocyanates, for example, may be used in the present invention.

By way of example, a suitable polyol for the synthesis of a TPU for use as a toughening agent in the curable cyanoacrylate compositions of the present invention can include: a crystalline or partly crystalline polyol, such as for example a (co)-polyester polyol, or a (co)-polyether polyol, suitably a (co)-polyester polyol.

Commercially available polyols include:
(i) Polyol CAPA 2201 ex Perstorp—solid highly crystalline co-polyester
(ii) Polyol Terathane 2000—polyether glycol
(iii) Polyol Dynacoll 7390—solid highly crystalline co-polyester
(iv) Polyol Dynacoll 7361—solid partially crystalline saturated co-polyester
(v) Polyol Dynacoll 7360—solid partially crystalline saturated co-polyester
(vi) Polyol Dynacoll 7363—solid partially crystalline saturated co-polyester
(vii) Polyol Dynacoll 7380—polyester polyol with an OH number from about 27 to about 34, a polyester of dodecanedioic acid and 1,6-hexanediol.

By way of example, a compound useful in the practice of this invention bearing at least two isocyanate groups, for example a polyisocyante compound, suitable for the synthesis of a TPU for use as a toughening agent in the curable cyanoacrylate compositions of the present invention can include: 1,4-diisocyanatobenzene (PPDI), toluene diisocyanate (TDI), 4,4'-diphenylmethane diisocyanate (4,4'-MDI), 2,4'-diphenylmethane diisocyanate (2,4'-MDI), polymethylene poly(phenyl isocyanate) (PMDI), 1,5-naphthalene diisocyanate (NDI), bitolylene diisocyanate (TODI), 1,3-xylene diisocyanate (XDI), p-1,1,4,4-tetramethylxylene diisocyanate (p-TMXI), m-1,1,3,3-tetramethylxylylene diisocyanate (m-TMXDI), 1,6-diisocyanato-2,4,4-trimethylhexane, 1,4-cyclohexane diisocyanate (CHDI), 1,4-cyclohexanebis (methylene isocyanate) (BDI), 1,3-bis (isocyanatomethyl)cyclohexane (H6XDI), 3-isocyanatomethyl-3,5,5-trimethylcyclohexyl isocyanate (IPDI), dicyclohexylmethane diisocyanate (H12MDI), triphenylmethane-4,4',4"-triisocyanate, and the like. Mixtures of polyisocyanates, e.g., 2,4'-MDI and 4,4'-MDI, may be used. For example, a suitable polyisocyanate is substantially pure 4,4'-diphenylmethane diisocyanate (MDI). Diphenylmethane diisocyanate is also known as 4,4'-methylene diphenyl diisocyanate, or methylene bis-phenyldiisocyanate; using IUPAC nomenclature it is known as 1,1'-methylenebis(4-isocyanatobenzene).

The cyanoacrylate component of the curable cyanoacrylate composition may be present in an amount from about 10% to about 95% by weight based on the total weight of the composition, for example about 40% to about 90% by weight based on the total weight of the composition.

The TPU component of the curable cyanoacrylate composition may be present in an amount from about 5% to about 90% by weight based on the total weight of the composition, for example about 10% to about 60% by weight based on the total weight of the composition.

The cyanoacrylate component of the curable cyanoacrylate composition of the present invention can be represented by the general formula (A)

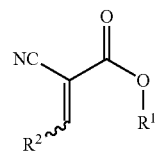

wherein:
$R^1$ is a straight chain or branched chain alkyl group having 1 to 12 carbon atoms, a straight chain or branched chain alkenyl group having 2 to 12 carbon atoms, a straight chain or branched chain alkynyl group having 2 to 12 carbon atoms, a cycloalkyl group, an aralkyl group or an aryl group; wherein $R^1$ is optionally substituted with at least one halogen and/or at least one $C_1$-$C_{12}$ alkoxy group; and $R^2$ is selected from the group hydrogen, a straight chain or branched chain alkyl group having 1 to 12 carbon atoms, a straight chain or branched chain alkenyl group having 2 to 12 carbon atoms, a straight chain or branched chain alkynyl group having 2 to 12 carbon atoms, a straight chain or branched chain alkoxy group having 1 to 12 carbon atoms, a cycloalkyl group, an aralkyl group or an aryl group; where $R^2$ is optionally substituted with at least one halogen and/or at least one $C_1$-$C_{12}$ alkoxy group. The cyanoacrylate component may be selected for example from the group comprising ethyl 2-cyanoacrylate and β-methoxycyanoacrylate.

Optionally, the curable cyanoacrylate compositions of the present invention may further comprise surface modified microparticles of ultra-high molecular weight polyethylene as a component, in an amount from about 0.05 wt % to about 20 wt %, such as from about 0.5 wt % to about 5 wt %, for example at 1 wt %. All wt % are based on the total weight of the cyanoacrylate composition of the invention unless otherwise stated.

Such a component may take many forms. For instance, Inhance/Fluoro-Seal, Ltd.s' surface-modification technology is a controlled oxidation process in which a reactive gas atmosphere modifies the outermost molecular layer of a particle. The treatment causes the molecular backbone and/or side chains to react, resulting in formation of polar functional groups on the surface, such as hydroxyls and carboxylates. According to Inhance's website, these oxygen-containing chemical functionalities cause the treated particles to have high surface energy. This in turn means that the treated particles are readily wetted and dispersed in polar polymers, such as polyols. The surface modification also results in stronger bonding between the particles and the rest of the components in the composition. The enhanced adhesion is a result of chemical bonding with surface functionalities and hydrogen. See: www.inhanceproducts.com/technology.html, Jun. 20, 2017.

Commercially available surface modified polyolefins from Inhance™ include those in the family described as INHANCE® UH-1000 and HD-1000 series particles. Specific representatives of that family include those designated as UH-1045 (having an average size of 300 μm), UH-1080 (having an average size of 125 μm), UH-1200 (having an average size of 63 μm), UH-1250 (having an average size of 53 μm), UH-1500 (having an average size of 45 μm), UH-1700 (having an average size of 38 μm) and HD-1800 (having an average size of 18 μm). INHANCE® UH-1000 series particles are free flowing white particles or powder, derived from virgin ultra-high molecular weight polyethylene (UHMWPE) resin, and having the following general properties:

Surface Energy: 55+ dynes/cm (water wettable)
Specific Gravity: 0.93-0.94 g/cc
Bulk Density: 20-31 lb./ft$^3$ (0.32-0.50 g/cc)
Molecular Weight: 3,000,000-5,000,000 g/mol
INHANCE® UH-1000 Series Particles are reported to provide composites with superior abrasion resistance, reduced coefficient of friction, enhanced work of fracture and improved moisture barrier.

By way of non-limiting example, one such optional component is INHANCE® UH-1080 ('UH-1080'), which comprises surface modified microparticles of ultra-high molecular weight polyethylene having an average size of 125 μm. By way of another non-limiting example, one such optional component is INHANCE® UH-1250 ('UH-1250'), which comprises surface modified microparticles of ultra-high molecular weight polyethylene having an average size of 53 μm. Said optional components can optionally be present in an amount from about 0.05 wt % to about 20 wt %, such as from about 0.5 wt % to about 5 wt %, for example at 1 wt %, based on the total weight of the curable cyanoacrylate composition.

As used herein, the term 'stabiliser', such as for example 'Lewis acid stabiliser' or 'Brønsted acid stabiliser', refers to a substance that stabilises the cyanoacrylate component, for example, by inhibiting premature polymerisation of the cyanoacrylate composition. As used herein, components designated by the term 'chain extender' are to be understood as being distinct from components designated by the term 'polyol'.

The curable cyanoacrylate compositions of the present invention may comprise a stabiliser such as sulfur dioxide ($SO_2$), or such as the Lewis acid stabiliser boron trifluoride ($BF_3$), in an amount from about 0.0005 wt % to about 5 wt % based on the total weight of the cyanoacrylate composition. For example, $BF_3$ may be present for example at 20 ppm or for example at 50 ppm. The curable cyanoacrylate compositions of the present invention may optionally comprise a Brønsted acid stabiliser such as hydrogen fluoride (HF) at an amount from about 0.0005 wt % to about 5 wt % based on the total weight of the cyanoacrylate composition.

As used herein, "Stabiliser Solution" specifically refers to a freshly prepared stock solution of curable ethyl cyanoacrylate (ECA) comprising boron trifluoride ($BF_3$) at 1000 parts per million (ppm). Said Stabiliser Solution can be used to adjust to a desired final concentration of $BF_3$ stabiliser in a curable cyanoacrylate composition; for example a final concentration of 50 ppm $BF_3$, or for example a final concentration of 20 ppm $BF_3$. The skilled person will readily appreciate that other suitable stabilisers, for example another suitable Lewis acid, or for example the stabiliser $SO_2$, could be used to stabilise the curable cyanoacrylate component. It is disclosed that similar stabiliser solutions can be prepared using β-methoxy cyanoacrylate, or butyl cyanoacrylate, or any other suitable cyanoacrylate as the carrier for the stabiliser, said stabiliser solutions being suitable for adjusting the amount of a given stabiliser in curable compositions based on cyanoacrylates other than ECA.

DETAILED DESCRIPTION

Figure 1:
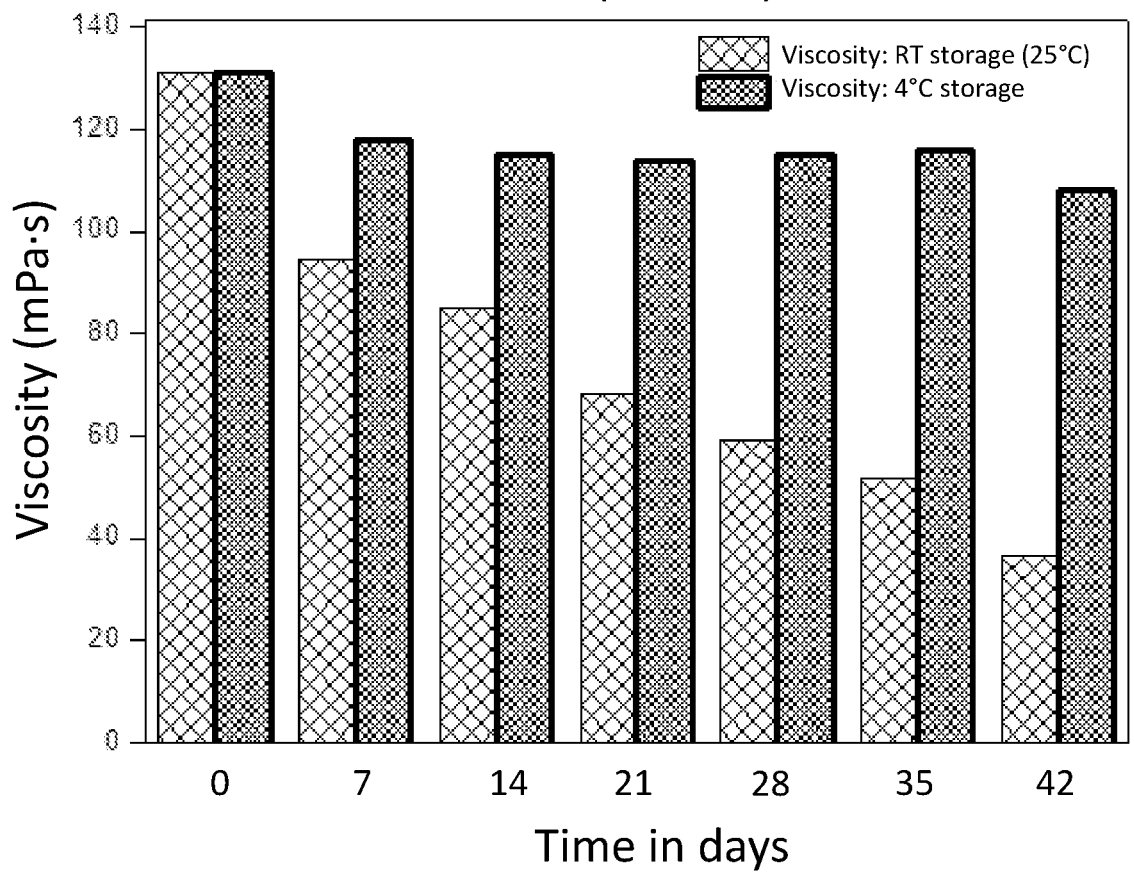
FIG. 1: Bar chart showing the effect of storage temperature (25° C. and 4° C.) on the viscosity over time of an ethyl cyanoacrylate composition (Comparative Example 1; CEx1) comprising a BDO-based TPU (TPU-B1), as measured at 7-day intervals over 42 days. Composition viscosities were measured at 25° C. using a Brookfield LVT 4 viscometer; the viscosity results are reported in units of millipascal-seconds (mPa·s).

The present invention is directed to the use of a chain extender in the synthesis of TPUs that results in the TPU having a structural unit with the formula: —O—$R^1$—O—Ar—O—$R^2$—O—, wherein Ar is a $C_6$-$C_{20}$ aromatic group with at least one aromatic ring; $R^1$ is $C_2$-$C_{10}$ alkyl group; and $R^2$ is $C_2$-$C_{10}$ alkyl group wherein the TPUs bearing said structural unit are subsequently used as toughening agents in cyanoacrylate adhesives compositions. It has been surprisingly found that the use of said TPU toughening agent imparts to the resulting curable cyanoacrylate compositions long-term viscosity stability at room temperature (25° C.); i.e. for at least 1 month. By viscosity stability is meant that the viscosity does not drop from the starting viscosity after 1 month at room temperature.

TPUs are synthesised from polyols, isocyanate compounds and chain extender compounds. Therefore, it is to be understood that the chain extenders are components used in the synthesis of the TPU, and that the chain extenders become incorporated as a structural unit of the TPU. For the avoidance of doubt, there are no free, unreacted chain extenders present in the final toughened cyanoacrylate compositions of the present invention—rather, all chain extenders will have become structurally incorporated into the TPU toughening agent during synthesis of said TPU.

Owing to the stochastic nature of the polymerisation process, very slight variations can arise from batch to batch of TPU, even when identical components are mixed in an identical manner, at identical proportions. Accordingly, different batches of a TPU prepared using the same components, at identical weight percentages, can have a slightly different molecular weight (Mw)/Mw distribution.

Example TPUs

A range of TPU materials were synthesised and then formulated in curable cyanoacrylate compositions to test their suitability as toughening agents. All of the TPUs described in the following Example TPU 'Preparation' sub-sections were prepared from a polyol, an isocyanate compound, and HQEE (Structure 1) chain extender. The curable cyanoacrylate compositions Example 1 (Ex1), Example 2 (Ex2), and Example 3 (Ex3) formulated with the Example TPUs of the following sub-sections, as identified in the Formulation Table (Table 1), are examples of curable cyanoacrylate compositions according to the present invention.

Preparation of Example TPUs: TPU-A1, TPU-A2, and TPU-A3

Three batches of an Example TPU-TPU-A1 (batch 1), TPU-A2 (batch 2), and TPU-A3 (batch 3)—were prepared using identical components at identical weight percentages. Minor batch-to-batch variation in the Mw/Mw distribution of the resulting TPUs—TPU-A1, TPU-A2, and TPU-A3—is reflected in the performance of the Example Compositions in which they are present (Ex1, Ex2, and Ex3, respectively), as shown for example in FIGS. 3-6. Said batches were each prepared as follows: A solid partially crystalline saturated co-polyester polyol, Dynacoll 7360 (359.71 g), was melted at temperatures between of 110-120° C. in a three necked resin kettle along with Irganox 1010 antioxidant (2.17 g) ex Ciba. A 1-3 mbar vacuum was applied. Melting whilst under vacuum increases the efficiency of the degassing and moisture removal procedure whilst reducing the possibility of polyol depletion due to deposition on the vessel side walls. Once melted (~30-40 mins) the polyol was stirred for 30 mins at 100 rpm under vacuum, this allows for further removal of unwanted moisture. The vacuum was removed by the introduction of a slight $N_2$ flow. Methylene bis-phenyldiisocyanate (MDI) flake (45.58 g) was added through a wide necked funnel. The vessel was stoppered and the $N_2$ bleed removed. The reaction was maintained at 115° C. and the stirrer speed was increased to 250 rpm for 15 mins without vacuum. After this time the reaction was again placed under vacuum (1-3 mbar), for 15 mins. The vacuum was removed and three 1 g samples were taken at this time. These samples were taken in order to correctly determine the amount of unreacted NCO at this time. This is a quality control step relevant to the Mw distribution of the resulting TPU. The reaction vessel was stoppered and again placed under vacuum with continuous stirring. The vacuum was removed by the introduction of a slight $N_2$ flow. HQEE (22.56 g) chain extender was added via a dropping funnel ensuring full delivery under $N_2$. The vessel was again stoppered and the mixing speed was maintained at 250 rpm. The reaction was allowed to proceed at a temperature of 115° C. ensuring that the exothermic reaction did not exceed 125° C. After addition of the chain extender the reaction proceeded for 15 mins without vacuum and 15 mins with vacuum.

Components Used in the Preparation for Each of the TPU Batches TPU-A1, TPU-A2, and TPU-A3

| Components | Mass (g) | Percentage by weight |
|---|---|---|
| Dynacoll 7360 (polyol) | 359.71 | 83.65% |
| MDI | 45.58 | 10.60% |
| HQEE | 22.56 | 5.25% |
| Irganox 1010 | 2.17 | 0.5% |
| Total | 430.02 | 100% |

Comparative Examples

A range of TPU materials were synthesised and then formulated in curable cyanoacrylate compositions to test their suitability as toughening agents. All of the TPUs described in the following Comparative Example TPU 'Preparation' sub-sections were prepared from a polyol, an isocyanate compound, and a BDO chain extender (1,4-butanediol; Structure 2). CEx1, CEx2, CEx3, CEx4, CEx5, CEx6, CEx7, CEx8, CEx9, and CEx10, formulated with the Comparative Example TPUs of the following sub-sections, as identified in the Formulation Table (Table 1), are Comparative Examples of cyanoacrylate compositions; accordingly said Comparative Example cyanoacrylate compositions are compositions not according to the invention. Said compositions, comprising BDO-based TPUs have been characterised and they provide evidence of TPU-toughened cyanoacrylate compositions that do not exhibit long term (≥30 days) viscosity stability when stored at room temperature (25° C.), in contrast to compositions according to the present invention (FIG. 1, FIG. 3, and FIG. 4), emphasising the technical effect of employing TPUs as set out in the claims in curable cyanoacrylate compositions. The Comparative Examples of cyanoacrylate compositions were tested and shown to display good to excellent T peel performance when they had been stored at 4° C. prior to testing; however, all of these compositions displayed a decrease in viscosity over 30 days when stored at 25° C. (sometimes a dramatic >50% decrease in viscosity as compared to the initial viscosity), and this decrease in viscosity was matched by a corresponding decrease in T peel performance (for example, CEx1 performance in FIGS. 1 and 2). The decrease in viscosity referred to in connection with the Comparative Examples of curable cyanoacrylate compositions can be circumvented by replacing the BDO chain extender of the TPU component with a chain extender having the formula H—O—$R^1$—O—Ar—O—$R^2$—O—H, or with a chain extender that when structurally incorporated into said TPU component has the formula —O—$R^1$—O—Ar—O—$R^2$—O—, wherein Ar is a $C_6$-$C_{20}$ aromatic group with at least one aromatic ring; $R^1$ is $C_2$-$C_{10}$ alkyl group; and $R^2$ is $C_2$-$C_{10}$ alkyl group. A chain extender comprised by this formula is for example HQEE; in HQEE, Ar is a $C_6$ aromatic group with an aromatic ring, and $R^1$ and $R^2$ are both $C_2$ alkyl groups. HQEE is used as a chain extender for the TPUs that are present in the Example compositions. The use of TPUs based on for example, HQEE chain extender, for toughening of cyanoacrylate compositions is shown herein to impart significantly improved viscosity stability (relative to those comprising BDO-based TPUs; i.e. relative to the Comparative Examples), and is associated with T peel performance retention, when said compositions are tested following storage at room temperature (25° C.) for 30 days.

Preparation of Comparative Example TPU: TPU-B1 and TPU-B2

Two batches of a Comparative Example TPU—TPU-B1 (batch 1) and TPU-B2 (batch 2)—were prepared using identical components at identical weight percentages. Minor batch-to-batch variation in the Mw/Mw distribution of the resulting TPUs—TPU-B1 and TPU-B2—is reflected in the performance of the Comparative Example Compositions in which they are present (CEx1 and CEx9, respectively). Said batches were each prepared as follows: A solid partially crystalline saturated co-polyester polyol, Dynacoll 7361 (344.64 g), was melted at temperatures between of 110-120° C. in a three necked resin kettle along with Irganox 1010 antioxidant (2.0 g) ex Ciba. A 1-3 mbar vacuum was then applied. Melting whilst under vacuum increases the efficiency of the degassing and moisture removal procedure whilst reducing the possibility of polyol depletion due to deposition on the vessel side walls. Once melted (~30-40 mins) the polyol was stirred for 30 mins at 100 rpm under vacuum, this allows for further removal of unwanted moisture. The vacuum was removed by the introduction of a slight $N_2$ flow. Methylene bis-phenyldiisocyanate (MDI) flake (45.2 g) was added through a wide necked funnel. The vessel was stoppered and the $N_2$ bleed removed. The reaction was maintained at 115° C. and the stirrer speed was increased to 250 rpm for 15 mins without vacuum. After this time the reaction was again placed under vacuum (1-3 mbar), for 15 mins. The vacuum was removed and three 1 g samples were taken at this time. These samples were taken in order to correctly determine the amount of unreacted NCO at this time. The reaction vessel was stoppered and again placed under vacuum with continuous stirring. The vacuum was removed by the introduction of a slight $N_2$ flow. Butanediol (5.37 g) chain extender was added via a dropping funnel ensuring full delivery under $N_2$. The vessel was again stoppered and the mixing speed was maintained at 250 rpm. The reaction was allowed to proceed at a temperature of 115° C. ensuring that the exothermic reaction did not exceed 125° C. After addition of the chain extender the reaction proceeded for 15 mins without vacuum and 15 mins with vacuum.

Components Used in the Preparation for Each of the TPU Batches TPU-B1 and TPU-B2

| Components | Mass (g) | Percentage by weight |
|---|---|---|
| Dynacoll 7361 (polyol) | 344.64 | 86.77 |
| MDI | 45.2 | 11.38 |
| Butanediol | 5.37 | 1.35 |
| Irganox 1010 | 2.0 | 0.5 |
| Total | 397.21 | 100 |

Preparation of Comparative Example TPUs: TPU-C1 and TPU-C2

Two batches of a Comparative Example TPU—TPU-C1 (batch 1) and TPU-C2 (batch 2)—were prepared using identical components at identical weight percentages. Minor batch-to-batch variation in the Mw/Mw distribution of the resulting TPUs—TPU-C1 and TPU-C2—is reflected in the performance of the Comparative Example Compositions in which they are present (CEx2 and CEx3, respectively), as shown for example in FIGS. 3 and 6. Said batches were each prepared as follows: A solid partially crystalline saturated co-polyester polyol, Dynacoll 7360 (370.36 g), was melted at temperatures between of 110-120° C. in a three necked resin kettle along with Irganox 1010 antioxidant (2.15 g) ex Ciba. A 1-3 mbar vacuum was applied. Melting whilst under vacuum increases the efficiency of the degassing and moisture removal procedure whilst reducing the possibility of polyol depletion due to deposition on the vessel side walls. Once melted (~30-40 mins) the polyol was stirred for 30 mins at 100 rpm under vacuum, this allows for further removal of unwanted moisture. The vacuum was removed by the introduction of a slight $N_2$ flow. Methylene bis-phenyldiisocyanate (MDI) flake (46.93 g) was added through a wide necked funnel. The vessel was stoppered and the $N_2$ bleed removed. The reaction was maintained at 115° C. and the stirrer speed was increased to 250 rpm for 15 mins without vacuum. After this time the reaction was again placed under vacuum for (1-3 mbar) 15 mins. The vacuum was removed and three 1 g samples were taken at this time. These samples were taken in order to correctly determine the amount of unreacted NCO at this time. The reaction vessel was stoppered and again placed under vacuum with continuous stirring. The vacuum was removed by the introduction of a slight $N_2$ flow. Butanediol chain extender (BDO; Structure 2) (10.56 g) was added via a dropping funnel ensuring full delivery under $N_2$. The vessel was again stoppered and the mixing speed was maintained at 250 rpm. The reaction was allowed to proceed at a temperature of 115° C. ensuring that the exothermic reaction did not exceed 125° C. After addition of the chain extender the reaction proceeded for 15 mins without vacuum and 15 mins with vacuum.

Components Used in the Preparation for Each of the TPU Batches TPU-C1 and TPU-C2

| Components | Mass (g) | Percentage by weight |
|---|---|---|
| Dynacoll 7360(polyol) | 370.36 | 86.13% |
| MDI | 46.93 | 10.91% |
| BDO | 10.56 | 2.46% |
| Irganox 1010 | 2.15 | 0.50% |
| Total | 430.0 | 100% |

Preparation of Comparative Example TPU: TPU-D

A solid highly crystalline saturated co-polyester polyol, CAPA 2201 (303.88 g) ex Perstorp, was melted at temperatures between of 110-120° C. in a three necked resin kettle along with Irganox 1010 antioxidant (2.0 g) ex Ciba. A 1-3 mbar vacuum was applied. The polyol is described as having a melting point (m.p.) of 70° C. Melting whilst under vacuum increases the efficiency of the degassing and moisture removal procedure whilst reducing the possibility of polyol depletion due to deposition on the vessel side walls. Once melted (~30-40 mins) the polyol was stirred for 30 mins at 100 rpm under vacuum, this allows for further removal of unwanted moisture. The vacuum was removed by the introduction of a slight $N_2$ flow. Methylene bis-phenyldiisocyanate (MDI) flake (77.16 g) was added through a wide necked funnel. The vessel was stoppered and the $N_2$ bleed removed. The reaction was maintained at 115° C. and the stirrer speed was increased to 250 rpm for 15 mins without vacuum. After this time the reaction was again placed under vacuum (1-3 mbar), for 15 mins. The vacuum was removed and three 1 g samples were taken at this time. These samples were taken in order to correctly determine the amount of unreacted NCO (isocyante groups) at this time. The reaction vessel was stoppered and again placed under vacuum with continuous stirring. The vacuum was removed by the introduction of a slight $N_2$ flow. Butanediol (16.64 g) chain extender was added via a dropping funnel ensuring full delivery under $N_2$. The vessel was again stoppered and the mixing speed was maintained at 250 rpm. The reaction was allowed to proceed at a temperature of 115° C. ensuring that the exothermic reaction did not exceed 125° C. After addition of the chain extender the reaction proceeded for 15 mins without vacuum and 15 mins with vacuum.

Components Used in the Preparation of TPU-D

| Components | Mass (g) | Percentage by weight |
|---|---|---|
| CAPA 2201 (polyol) | 303.88 | 76.03 |
| MDI | 77.16 | 19.31 |
| Butanediol | 16.64 | 4.16 |
| Irganox 1010 | 2.0 | 0.5 |
| Total | 399.68 | 100 |

Preparation of Comparative Example TPU: TPU-E

A polyether glycol polyol, Terathane 2000 (305.2 g), was melted at temperatures between of 110-120° C. in a three necked resin kettle along with Irganox 1010 antioxidant (2.0 g) ex Ciba. A 1-3 mbar vacuum was applied. Melting whilst under vacuum increases the efficiency of the degassing and moisture removal procedure whilst reducing the possibility of polyol depletion due to deposition on the vessel side walls. Once melted (~30-40 mins) the polyol was stirred for 30 mins at 100 rpm under vacuum, this allows for further removal of unwanted moisture. The vacuum was removed by the introduction of a slight $N_2$ flow. Methylene bis-phenyldiisocyanate (MDI) flake (76.4 g) was added through a wide necked funnel. The vessel was stoppered and the $N_2$ bleed removed. The reaction was maintained at 115° C. and the stirrer speed was increased to 250 rpm for 15 mins without vacuum. After this time the reaction was again placed under vacuum (1-3 mbar), for 15 mins. The vacuum was removed and three 1 g samples were taken at this time. These samples were taken in order to correctly determine the amount of unreacted NCO at this time. The reaction vessel was stoppered and again placed under vacuum with continuous stirring. The vacuum was removed by the introduction of a slight $N_2$ flow. Butanediol (16.48 g) chain extender was added via a dropping funnel ensuring full delivery under $N_2$. The vessel was again stoppered and the mixing speed was maintained at 250 rpm. The reaction was allowed to proceed at a temperature of 115° C. ensuring that the exothermic reaction did not exceed 125° C. After addition of the chain extender the reaction proceeded for 15 mins without vacuum and 15 mins with vacuum.

Components Used in the Preparation of TPU-E

| Components | Mass (g) | Percentage by weight |
|---|---|---|
| Terathane 2000 (polyol) | 305.2 | 76.3 |
| MDI | 76.4 | 19.1 |
| Butanediol | 16.48 | 4.12 |
| Irganox 1010 | 2.0 | 0.48 |
| Total | 400.08 | 100 |

Preparation of Comparative Example TPU: TPU-F

A solid highly crystalline saturated co-polyester polyol, Dynacoll 7390 (342.04 g), was melted at temperatures between of 110-120° C. in a three necked resin kettle along with Irganox 1010 antioxidant (2.0 g) ex Ciba. A 1-3 mbar vacuum was applied. Melting whilst under vacuum increases the efficiency of the degassing and moisture removal procedure whilst reducing the possibility of polyol depletion due to deposition on the vessel side walls. Once melted (~30-40 mins) the polyol was stirred for 30 mins at 100 rpm under vacuum, this allows for further removal of unwanted moisture. The vacuum was removed by the introduction of a slight $N_2$ flow. Methylene bis-phenyldiisocyanate (MDI) flake (47.2 g) was added through a wide necked funnel. The vessel was stoppered and the $N_2$ bleed removed. The reaction was maintained at 115° C. and the stirrer speed was increased to 250 rpm for 15 mins without vacuum. After this time the reaction was again placed under vacuum (1-3 mbar), for 15 mins. The vacuum was removed and three 1 g samples were taken at this time. These samples were taken in order to correctly determine the amount of unreacted NCO at this time. The reaction vessel was stoppered and again placed under vacuum with continuous stirring. The vacuum was removed by the introduction of a slight $N_2$ flow. Butanediol (10.16 g) chain extender was added via a dropping funnel ensuring full delivery under $N_2$. The vessel was again stoppered and the mixing speed was maintained at 250 rpm. The reaction was allowed to proceed at a temperature of 115° C. ensuring that the exothermic reaction did not exceed 125° C. After addition of the chain extender the reaction proceeded for 15 mins without vacuum and 15 mins with vacuum.

Components Used in the Preparation of TPU-F

| Components | Mass (g) | Percentage by weight |
|---|---|---|
| Dynacoll 7390 (polyol) | 342.04 | 85.21 |
| MDI | 47.2 | 11.76 |
| Butanediol | 10.16 | 2.53 |
| Irganox 1010 | 2.0 | 0.5 |
| Total | 401.40 | 100 |

Preparation of Comparative Example TPU: TPU-G

A solid partially crystalline saturated co-polyester polyol, Dynacoll 7363 (353.12 g), was melted at temperatures between of 110-120° C. in a three necked resin kettle along with Irganox 1010 antioxidant (2.0 g) ex Ciba. A 1-3 mbar vacuum was applied. Melting whilst under vacuum increases the efficiency of the degassing and moisture removal procedure whilst reducing the possibility of polyol depletion due to deposition on the vessel side walls. Once melted (~30-40 mins) the polyol was stirred for 30 mins at 100 rpm under vacuum, this allows for further removal of unwanted moisture. The vacuum was removed by the introduction of a slight $N_2$ flow. Methylene bis-phenyldiisocyanate (MDI) flake (35.6 g) was added through a wide necked funnel. The vessel was stoppered and the $N_2$ bleed removed. The reaction was maintained at 115° C. and the stirrer speed was increased to 250 rpm for 15 mins without vacuum. After this time the reaction was again placed under vacuum (1-3 mbar), for 15 mins. The vacuum was removed and three 1 g samples were taken at this time. These samples were taken in order to correctly determine the amount of unreacted NCO at this time. The reaction vessel was stoppered and again placed under vacuum with continuous stirring. The vacuum was removed by the introduction of a slight $N_2$ flow. Butanediol (7.68 g) chain extender was added via a dropping funnel ensuring full delivery under $N_2$. The vessel was again stoppered and the mixing speed was maintained at 250 rpm. The reaction was allowed to proceed at a temperature of 115° C. ensuring that the exothermic reaction did not exceed 125° C. After addition of the chain extender the reaction proceeded for 15 mins without vacuum and 15 mins with vacuum.

Components Used in the Preparation of TPU-G

| Components | Mass (g) | Percentage by weight |
|---|---|---|
| Dynacoll 7363 (polyol) | 353.12 | 88.63 |
| MDI | 35.6 | 8.94 |
| Butanediol | 7.68 | 1.93 |
| Irganox 1010 | 2.0 | 0.5 |
| Total | 398.4 | 100 |

Preparation of Comparative Example TPU: TPU-H

A solid partially crystalline saturated co-polyester polyol, Dynacoll 7363 (344.88 g), was melted at temperatures between of 110-120° C. in a three necked resin kettle along with Irganox 1010 antioxidant (2.0 g), ex Ciba. A 1-3 mbar vacuum was applied. Melting whilst under vacuum increases the efficiency of the degassing and moisture removal procedure whilst reducing the possibility of polyol depletion due to deposition on the vessel side walls. Once melted (~30-40 mins) the polyol was stirred for 30 mins at 100 rpm under vacuum, this allows for further removal of unwanted moisture. The vacuum was removed by the introduction of a slight $N_2$ flow. Methylene bis-phenyldiisocyanate (MDI) flake (46.0 g) was added through a wide necked funnel. The vessel was stoppered and the $N_2$ bleed removed. The reaction was maintained at 115° C. and the stirrer speed was increased to 250 rpm for 15 mins without vacuum. After this time the reaction was again placed under vacuum (1-3 mbar), for 15 mins. The vacuum was removed and three 1 g samples were taken at this time. These samples were taken in order to correctly determine the amount of unreacted NCO at this time. The reaction vessel was stoppered and again placed under vacuum with continuous stirring. The vacuum was removed by the introduction of a slight $N_2$ flow. Butanediol (9.64 g) chain extender was added via a dropping funnel ensuring full delivery under $N_2$. The vessel was again stoppered and the mixing speed was maintained at 250 rpm. The reaction was allowed to proceed at a temperature of 115° C. ensuring that the exothermic reaction did not exceed 125° C. After addition of the chain extender the reaction proceeded for 15 mins without vacuum and 15 mins with vacuum.

Components Used in the Preparation of TPU-H

| Components | Mass (g) | Percentage by weight |
|---|---|---|
| Dynacoll 7363 (polyol) | 344.88 | 86.09 |
| MDI | 46.0 | 11.48 |
| Butanediol | 9.64 | 2.41 |
| Irganox 1010 | 2.0 | 0.5 |
| Total | 402.52 | 100 |

Preparation of Comparative Example TPU: TPU-J

A solid partially crystalline saturated co-polyester polyol, Dynacoll 7360 (344.88 g), was melted at temperatures between of 110-120° C. in a three necked resin kettle along with Irganox 1010 antioxidant (2.0 g) ex Ciba. A 1-3 mbar vacuum was applied. Melting whilst under vacuum increases the efficiency of the degassing and moisture removal procedure whilst reducing the possibility of polyol depletion due to deposition on the vessel side walls. Once melted (~30-40 mins) the polyol was stirred for 30 mins at 100 rpm under vacuum, this allows for further removal of unwanted moisture. The vacuum was removed by the introduction of a slight $N_2$ flow. Methylene bis-phenyldiisocyanate (MDI) flake (44.0 g) was added through a wide necked funnel. The vessel was stoppered and the $N_2$ bleed removed. The reaction was maintained at 115° C. and the stirrer speed was increased to 250 rpm for 15 mins without vacuum. After this time the reaction was again placed under vacuum (1-3 mbar), for 15 mins. The vacuum was removed and three 1 g samples were taken at this time. These samples were taken in order to correctly determine the amount of unreacted NCO at this time. The reaction vessel was stoppered and again placed under vacuum with continuous stirring. The vacuum was removed by the introduction of a slight $N_2$ flow. Butanediol (8.2 g) chain extender was added via a dropping funnel ensuring full delivery under $N_2$. The vessel was again stoppered and the mixing speed was maintained at 250 rpm. The reaction was allowed to proceed at a temperature of 115° C. ensuring that the exothermic reaction did not exceed 125° C. After addition of the chain extender the reaction proceeded for 15 mins without vacuum and 15 mins with vacuum.

Components Used in the Preparation of TPU-J

| Components | Mass (g) | Percentage by weight |
|---|---|---|
| Dynacoll 7360 (polyol) | 344.64 | 86.77 |
| MDI | 45.2 | 11.38 |
| Butanediol | 5.37 | 1.35 |
| Irganox 1010 | 2.0 | 0.5 |
| Total | 397.21 | 100 |

TABLE 1

Formulation Table

| Components | Example Compositions | | | Comparative Example Compositions | | | | | | | | | |
|---|---|---|---|---|---|---|---|---|---|---|---|---|---|
| | Ex1 | Ex2 | Ex3 | CEx1 | CEx2 | CEx3 | CEx4 | CEx5 | CEx6 | CEx7 | CEx8 | CEx9 | CEx10 |
| TPU-A1 | 10.0 wt % | N/A | N/A | N/A | N/A | N/A | N/A | N/A | N/A | N/A | N/A | N/A | N/A |
| TPU-A2 | N/A | 10.0 wt % | N/A | N/A | N/A | N/A | N/A | N/A | N/A | N/A | N/A | N/A | N/A |
| TPU-A3 | N/A | N/A | 10.0 wt % | N/A | N/A | N/A | N/A | N/A | N/A | N/A | N/A | N/A | N/A |
| TPU-B1 | N/A | N/A | N/A | 10.0 wt % | N/A | N/A | N/A | N/A | N/A | N/A | N/A | N/A | N/A |
| TPU-B2 | N/A | N/A | N/A | N/A | N/A | N/A | N/A | N/A | N/A | N/A | N/A | 10.0 wt % | N/A |
| TPU-C1 | N/A | N/A | N/A | N/A | 10.0 wt % | N/A | N/A | N/A | N/A | N/A | N/A | N/A | N/A |
| TPU-C2 | N/A | N/A | N/A | N/A | N/A | 10.0 wt % | N/A | N/A | N/A | N/A | N/A | N/A | N/A |
| TPU-D | N/A | N/A | N/A | N/A | N/A | N/A | 10.0 wt % | N/A | N/A | N/A | N/A | N/A | N/A |
| TPU-E | N/A | N/A | N/A | N/A | N/A | N/A | N/A | 10.0 wt % | N/A | N/A | N/A | N/A | N/A |
| TPU-F | N/A | N/A | N/A | N/A | N/A | N/A | N/A | N/A | 10.0 wt % | N/A | N/A | N/A | N/A |
| TPU-G | N/A | N/A | N/A | N/A | N/A | N/A | N/A | N/A | N/A | 10.0 wt % | N/A | N/A | N/A |
| TPU-H | N/A | N/A | N/A | N/A | N/A | N/A | N/A | N/A | N/A | N/A | 10.0 wt % | N/A | N/A |
| TPU-J | N/A | N/A | N/A | N/A | N/A | N/A | N/A | N/A | N/A | N/A | N/A | N/A | 10.0 wt % |
| Ethyl Cyanoacrylate | 89.495 wt %; in each case | | | | | | | | | | | | |
| Boron trifluoride (BF$_3$; stabiliser) | 0.005 wt % That is: a final concentration of 50 ppm BF$_3$, in each case | | | | | | | | | | | | |
| INHANCE ® microparticles: UH-1250 | 0.50 wt %, in each case | | | | | | | | | | | | |

Formulation of Compositions

Formulation details relating to the Example Compositions and the Comparative Example Compositions reported in Table 1 are described in this sub-section.

All compositions reported in Table 1 were formulated to comprise a total of 89.495 wt % curable ethyl cyanoacrylate, 0.005 wt % of the stabiliser BF$_3$ (that is, 50 ppm by weight), and then 10 wt % of a particular TPU and 0.5 wt % of surface modified microparticles of ultra-high molecular weight polyethylene (UH-1250 INHANCE® microparticles, in this case) wherein the weight-percentages (wt %) are based on the total weight of the composition. During formulation of the Example/Comparative Example Compositions said microparticles were added at the same time as the particular TPU component; however, it is to be understood that surface modified microparticles of ultra-high molecular weight polyethylene are an optional component for compositions according to the present invention. Stabiliser Solution (1000 ppm $BF_3$ in ECA) was used to adjust the amount of $BF_3$ stabiliser in the curable ethyl cyanoacrylate component to the desired concentration of 50 ppm (forming a stabilised ECA component); then, the particular TPU was finely sliced and rapidly mixed with the stabilised ECA component at a temperature of 65° C. for a time sufficient dissolve the TPU component into the stabilised ECA component. Surface modified microparticles of ultra-high molecular weight polyethylene (such as for example, UH-1250 INHANCE® microparticles) were added at the same time as the finely sliced TPU, at a temperature of 65° C. and rapidly mixed for a time sufficient dissolve the microparticles. Upon cooling to room temperature (25° C.), formulation of the given composition was complete. Completion of formulation was taken to be 'T=0'; thus, samples were taken at this time for tests (per results shown in FIGS. 1-4). The samples of each given composition were then stored, either at room temperature (25° C.) or at 4° C., and subjected to various tests as described in the "Results of Tests on Compositions" section.

Freshly prepared stock Stabiliser Solution is used to mix in a stabiliser of the curable cyanoacrylate component (such as $BF_3$) to a pure ECA component of the compositions (forming thereby a 'stabilised ECA component'), prior to the addition of the given TPU, to ensure that the desired final concentration of stabiliser can be conveniently achieved (for example, 50 ppm BF3, or for example, 20 ppm BF3). Stabiliser Solution comprises curable ethyl cyanoacrylate (ECA); therefore the total amount of curable ethyl cyanoacrylate (ECA) reported for the compositions described in Table 1 includes the contribution from both the pure ECA solution and the Stabiliser Solution. By way of example, the composition Example 1 (Ex1) comprises a stabiliser, $BF_3$, at a final concentration of 50 ppm by weight, said $BF_3$ content being adjusted/determined by the addition of Stabiliser Solution; accordingly Example Composition 1 (Ex1) comprises a total of 89.495 wt % ECA (ECA from the initially pure ECA solution and yet further ECA from the stock Stabiliser Solution comprising 1000 ppm $BF_3$), wherein the wt %'s are based on the total weight of the composition.

Results of Tests on Compositions

Initial tests to identify toughening agents for cyanoacrylate compositions focused on TPUs based on BDO chain extenders; see Comparative Examples 1, 2 and 3, CEx1-3, as identified in the Formulation Table (Table 1). However, as can be seen from FIG. 1 and FIG. 3, testing revealed that when such compositions comprising BDO-based TPU (TPU-B1) had been stored at room temperature (25° C.)—which it is envisioned would be the most convenient storage temperature for end-use applications—the viscosity of such cyanoacrylate compositions decreases from the initial viscosity at 'day 0' (T=0), as measured at 7-day intervals over 42 days. Indeed, for the composition Comparative Example 1 (CEx1), comprising TPU-B1, as shown in FIG. 1, the viscosity was found to have decreased strikingly by >50% of the starting viscosity within 28 days, with yet further decreases in viscosity recorded out to 42 days. Without wishing to be bound by any theorem, it is inferred that this behaviour seen in cyanoacrylate compositions following storage at room temperature (25° C.) may be attributable to the continual breakdown of hydrogen bonding within the BDO-based TPU component over time. Viscosities were measured using a Brookfield LVT 4 viscometer. The striking decrease in viscosity over time seen for the composition (CEx1) comprising BDO-based TPU (TPU-B1) shown in FIG. 1, was demonstrated to be further associated with a simultaneous decrease in T peel performance (FIG. 2).

Figure 2:
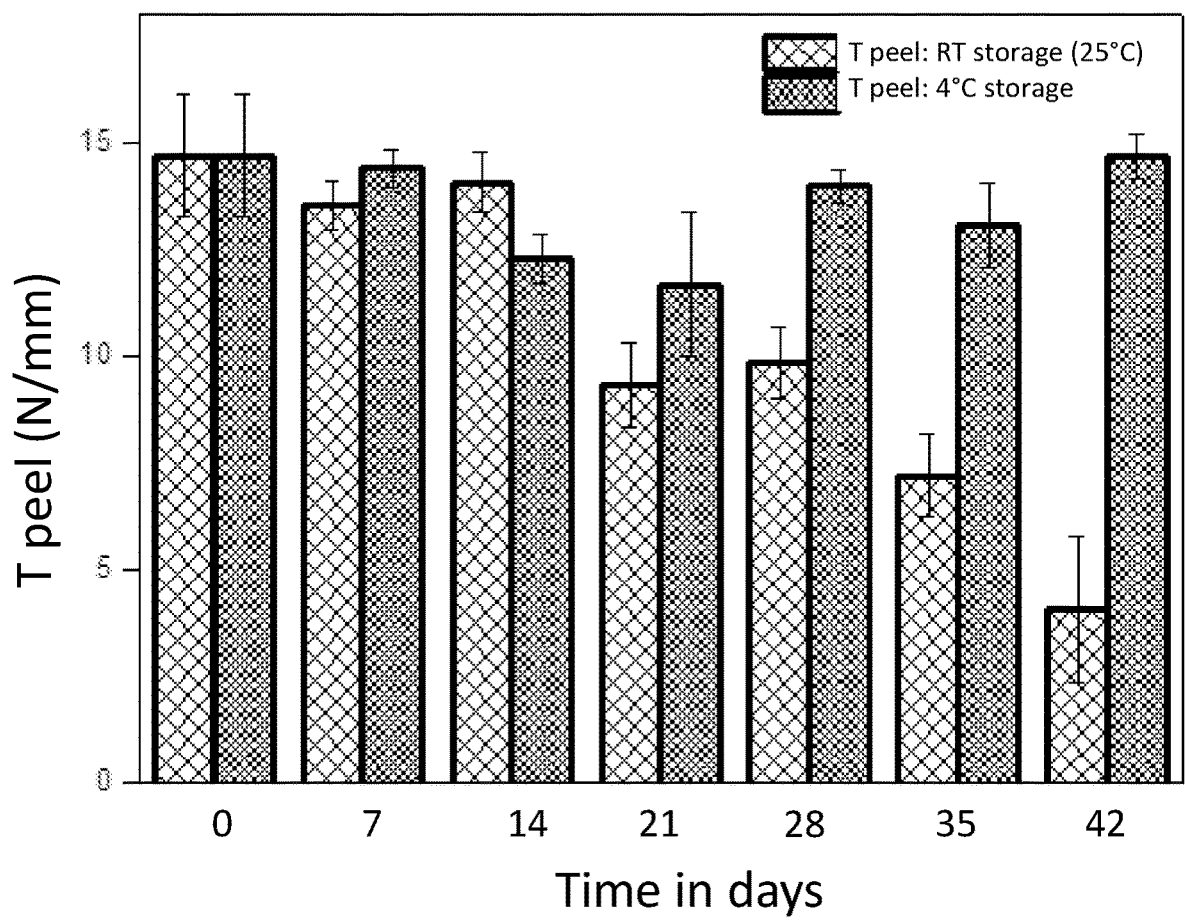
FIG. 2: Bar chart showing the effect of storage temperature (25° C. and 4° C.) on the T peel performance of an ethyl cyanoacrylate composition (CEx1) comprising a BDO-based TPU (TPU-B1), as measured at 7-day intervals over 42 days. T-peel tests were performed in accordance with ASTM-710/ISO 11339. The T peel measurements are reported in newtons per millimeter (N/mm).

As can be seen in FIG. 2, a drop in T-peel performance was measured on samples of a Comparative Example composition (CEx1) when tested every 7-days over 42 days (i.e. >1 month), during which time the curable cyanoacrylate composition comprising a BDO-based TPU (TPU-B1) was stored at 25° C. The results reported in FIG. 2 were obtained following 24 hour cure at 90° C. T-peel tests were performed in accordance with ASTM-710/ISO 11339. Storage at 4° C. prior to testing did not appear to result in long-term decline in T peel performance (FIG. 2).

Figure 3:
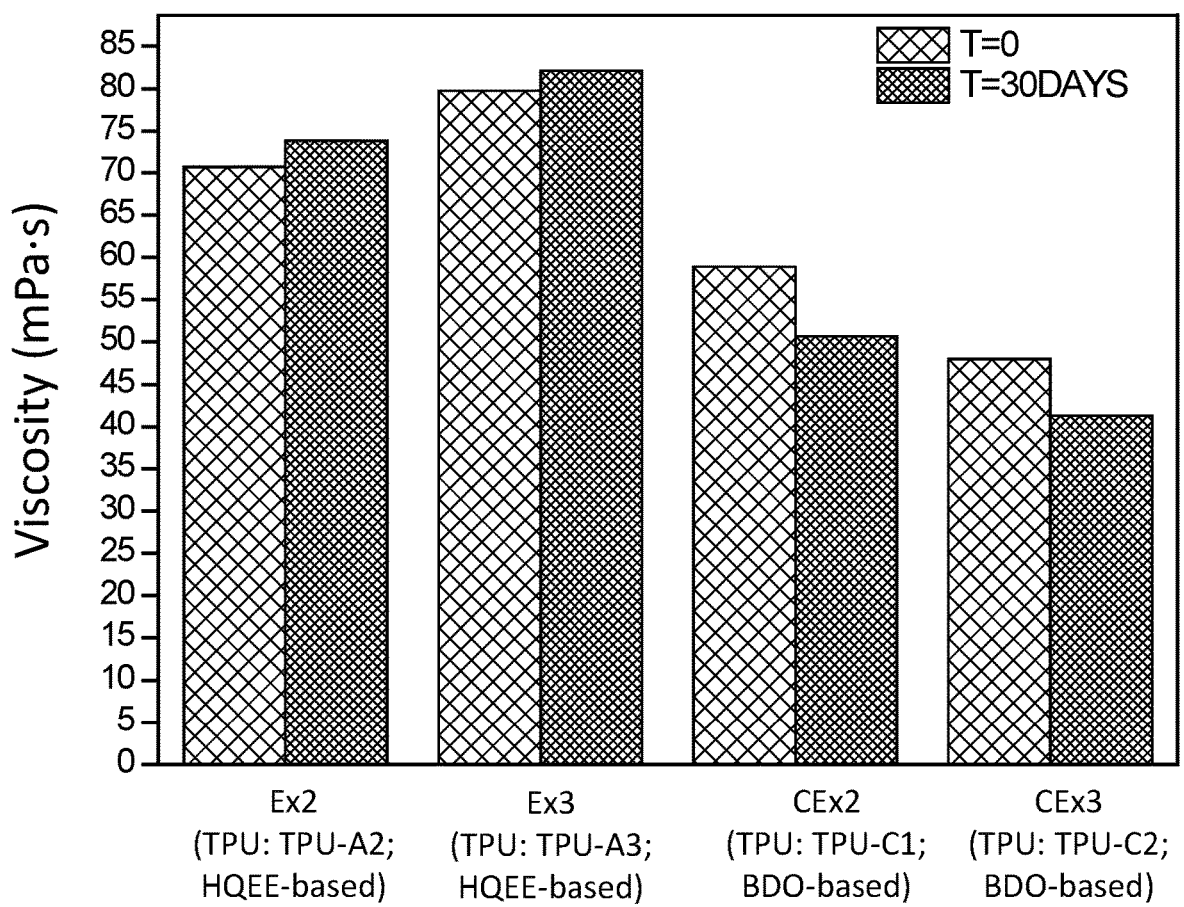
FIG. 3: Bar chart showing the effect of TPUs based on HQEE chain extender or BDO chain extender on the viscosity stability of curable cyanoacrylate compositions. Results are shown for Example Composition 2 (Ex2) and Example Composition 3 (Ex3), and Comparative Example Composition 2 (CEx2) and Comparative Example Composition 3 (CEx3). Room temperature (25° C.) viscosity measurements are reported in FIG. 3 using freshly prepared compositions tested immediately after formulation (T=0) and compositions that had been stored for 30 days at 25° C. immediately prior to testing (T=30DAYS). The TPU present in each composition is provided in FIG. 3 and whether said TPU is BDO-based or HQEE-based is specified.
Figure 4:
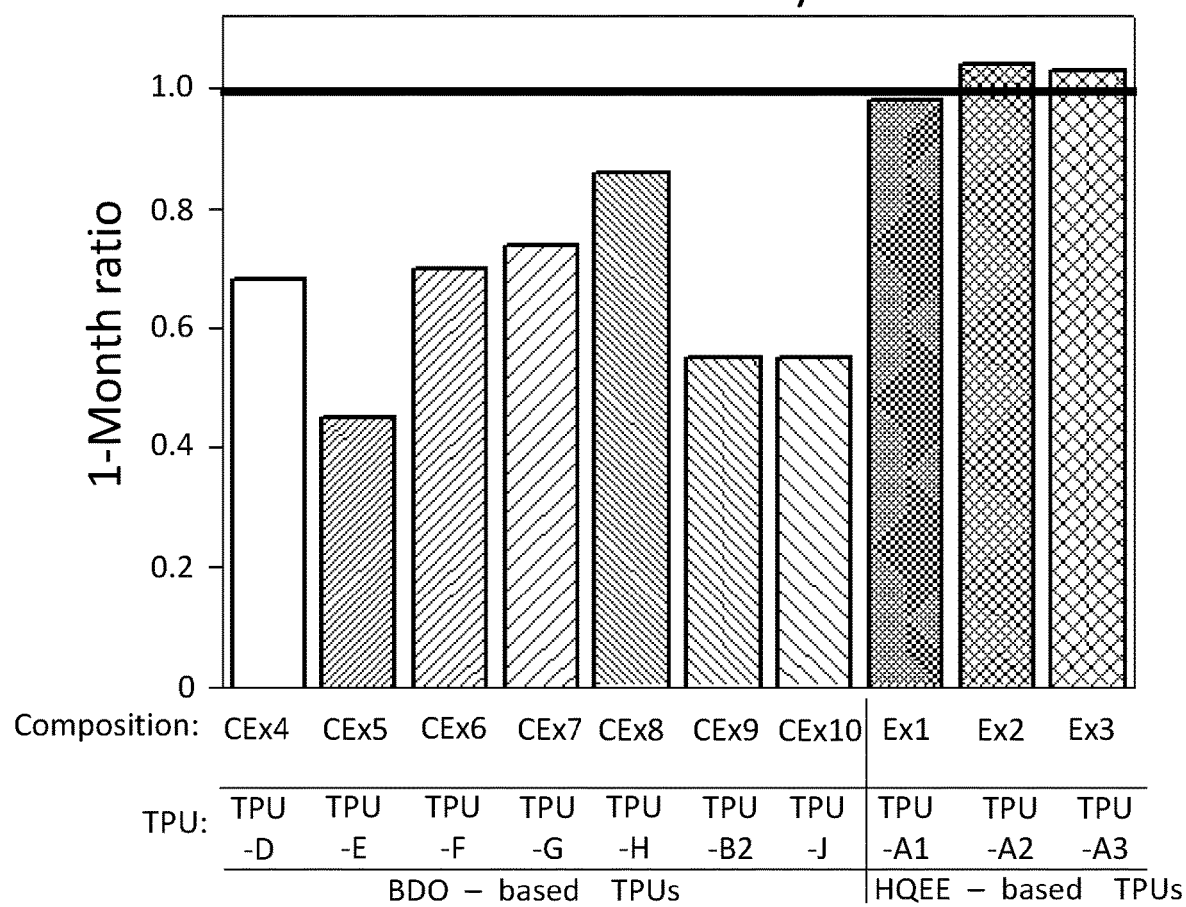
FIG. 4: Bar chart showing the ratio of the viscosity of a tested composition at 30 days following storage at 25° C. (nominator; time calculated from the instant of formulation) to the initial viscosity (T=0, immediately after fresh preparing a composition; denominator) of said tested composition. Said ratio is hereinafter termed the '1-month ratio'. All reported viscosities in FIG. 4 are as measured at 25° C. An unchanged viscosity measurement at 'T=0' and 'T=30 days' would result in a 1-month ratio of unity (1.0). For convenient reference, a solid black line has been depicted in the bar chart to indicate the position of the 1-month ratio equal to unity. Bars with maximum values well below the solid black line show compositions exhibiting a decrease in viscosity over 30 days storage at room temperature, whereas, bars with maximum values very close to the solid black line show compositions exhibiting 'viscosity stability' out to 30 days. Results are shown for Example Composition 1 (Ex1), Example Composition 2 (Ex2), and Example Composition 3 (Ex3), and for Comparative Example Compositions 4-10. The TPU present in each composition is provided in FIG. 4 and whether said TPU is BDO-based or HQEE-based is specified.

However, it was surprisingly found that replacement of BDO (Structure 2), with HQEE (Structure 1) as the chain extender component of the TPU that is used to toughen the cyanoacrylate composition resulted in cyanoacrylate compositions exhibiting 'viscosity stability' following 30 days storage at room temperature (25° C.). Viscosity stability refers to a substantially unchanged viscosity at the start and end of the measuring time period. FIG. 3 shows the results of viscosity measurements recorded at 25° C., following 30 days storage at room temperature (25° C.), on Example Composition 2 (Ex2) and Example Composition 3 (Ex3) both of which comprise an HQEE-based TPU (TPU-A2 and TPU-A3, respectively), and Comparative Example Composition 2 (CEx2) and Comparative Example Composition 3 (CEx3), both of which Comparative Examples comprise a BDO-based TPU (TPU-C1 and TPU-C2, respectively). As is clear from FIG. 3, although the compositions comprising a BDO-based TPU (CEx2, CEx3) exhibit a decrease in viscosity over the 30 day test-period as compared to the initially recorded viscosity at T=0, both of the Example compositions comprising an HQEE-based TPU (Ex2, Ex3) exhibit viscosity stability. Following on from the test results reported in FIG. 3, a range of further cyanoacrylate compositions comprising BDO-based TPUs were prepared (CEx4-CEx10; see Table 1) and they were compared in tests for viscosity stability versus Example Compositions comprising HQEE-based TPUs (Ex1-Ex3; see Table 1), by recording a '1-month ratio' value for each composition (FIG. 4). A '1-month ratio' refers to the ratio of the viscosity as measured following storage at room-temperature for 30 days after formulation (25° C. storage; T=30 days) to the initial viscosity (T=0; measured at 25° C. using freshly formulated compositions). The results are summarised in Table 2.

TABLE 2

'1-Month ratio table'

| Composition | Chain extender on which the TPU present in the composition is based | Viscosity (mPa · s; 25° C.) at T = 0 | Viscosity (mPa · s; 25° C.) at T = 30 days storage at 25° C. | The ratio of the viscosity at T = 30 days to the initial viscosity at T = 0 ("1-Month ratio") |
|---|---|---|---|---|
| CEx4 | BDO | 42.5 | 29.0 | 0.68 |
| CEx5 | BDO | 293 | 133 | 0.45 |
| CEx6 | BDO | 175 | 123 | 0.70 |
| CEx7 | BDO | 103 | 77.1 | 0.74 |
| CEx8 | BDO | 103 | 89.2 | 0.86 |
| CEx9 | BDO | 171 | 94.8 | 0.55 |
| CEx10 | BDO | 101 | 55.5 | 0.55 |
| Ex1 | HQEE | 112 | 110 | 0.98 |
| Ex2 | HQEE | 70.7 | 73.8 | 1.04 |
| Ex3 | HQEE | 79.7 | 82.1 | 1.03 |

Strikingly, only the compositions comprising an HQEE-based TPU (Ex1, Ex2, Ex3), exhibit long-term viscosity stability; that is, a '1-Month ratio' within 5% of unity. These results are graphically summarised in FIG. 4.

In addition to BDO, chain extenders such as 1,3-propanediol, 1,8-octanediol, and 1,12-dodecanediol were tested as replacement chain extenders in the synthesis of TPUs, which TPUs were subsequently tested as toughening agents in cyanoacrylate compositions. However, none of the TPUs synthesised with said chain extenders, when formulated with cyanoacrylate, resulted in toughened cyanoacrylate compositions characterised by long-term (≥30 days) viscosity stability at room temperature. Rather, in each such case, the viscosity steadily declined over time, with a corresponding decrease in T peel strength (N/mm) as compared to the initial T peel strength at T=0. Thus, these findings of poor long term viscosity performance, and the Results for the Comparative Example Compositions comprising BDO-based TPUs (as shown in FIGS. 3 and 4), emphasise the striking technical effect—viscosity stabilisation—achieved by using HQEE as a chain extender in a TPU that is subsequently formulated into a cyanoacrylate composition. Example Compositions equivalent to those reported in Table 1 were prepared lacking any INHANCE® microparticles (the mass of the microparticles being replaced by a further 0.50 wt % ethyl cyanoacrylate); it was found that the removal of this optional component had no detrimental effect on the '1-month ratio' values of the equivalent Example Compositions. Similarly, replacement of the optional UH-1250 INHANCE® microparticles component with UH-1080 INHANCE® microparticles at 0.50 wt % had no detrimental effect on the '1-month ratio' values of the equivalent compositions.

Figure 5:
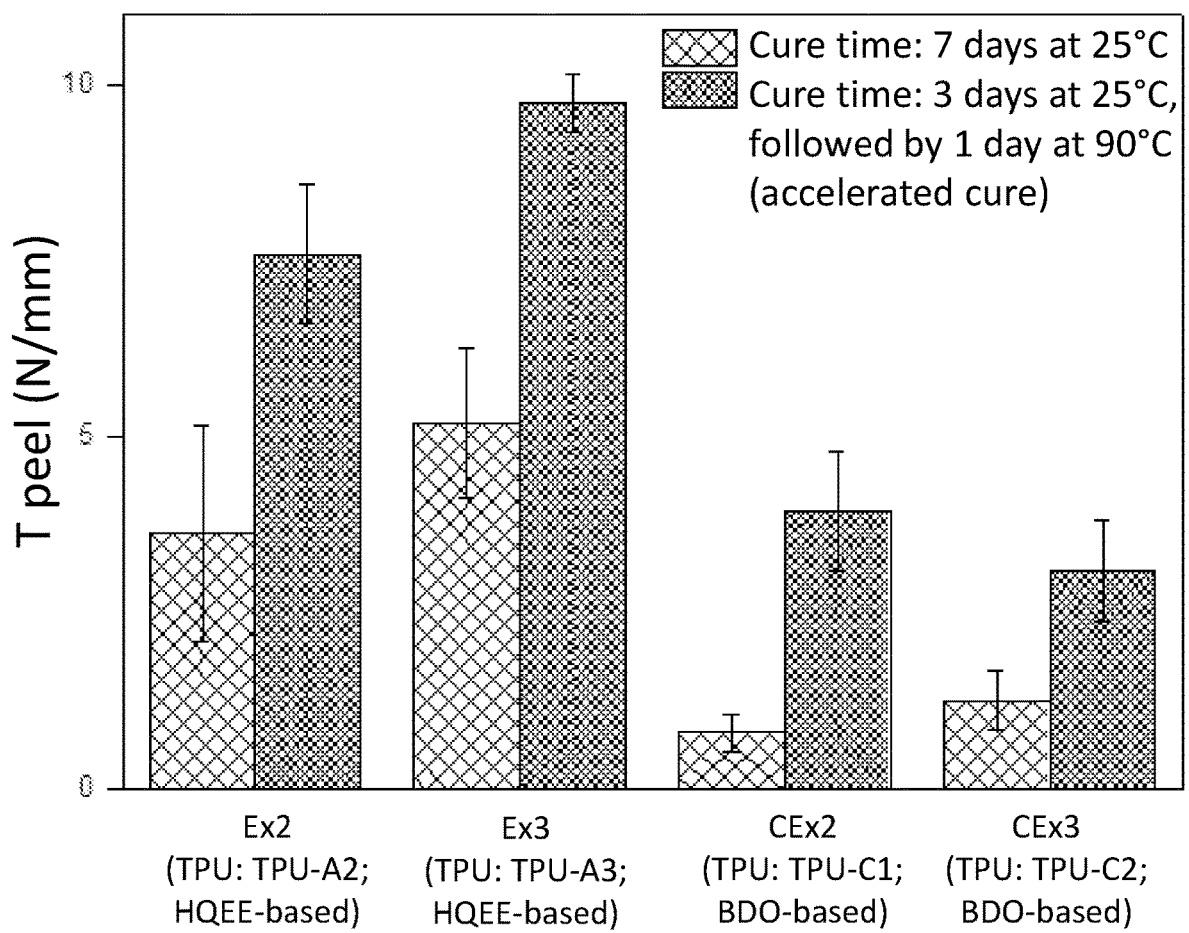
FIG. 5: Bar chart showing the T peel performance of Example Compositions (Ex1-3) and Comparative Example Compositions (CEx4-10) following 24 hour cure at 90° C. The TPU present in each composition is provided in FIG. 5 and whether said TPU is BDO-based or HQEE-based is specified.
Figure 6:
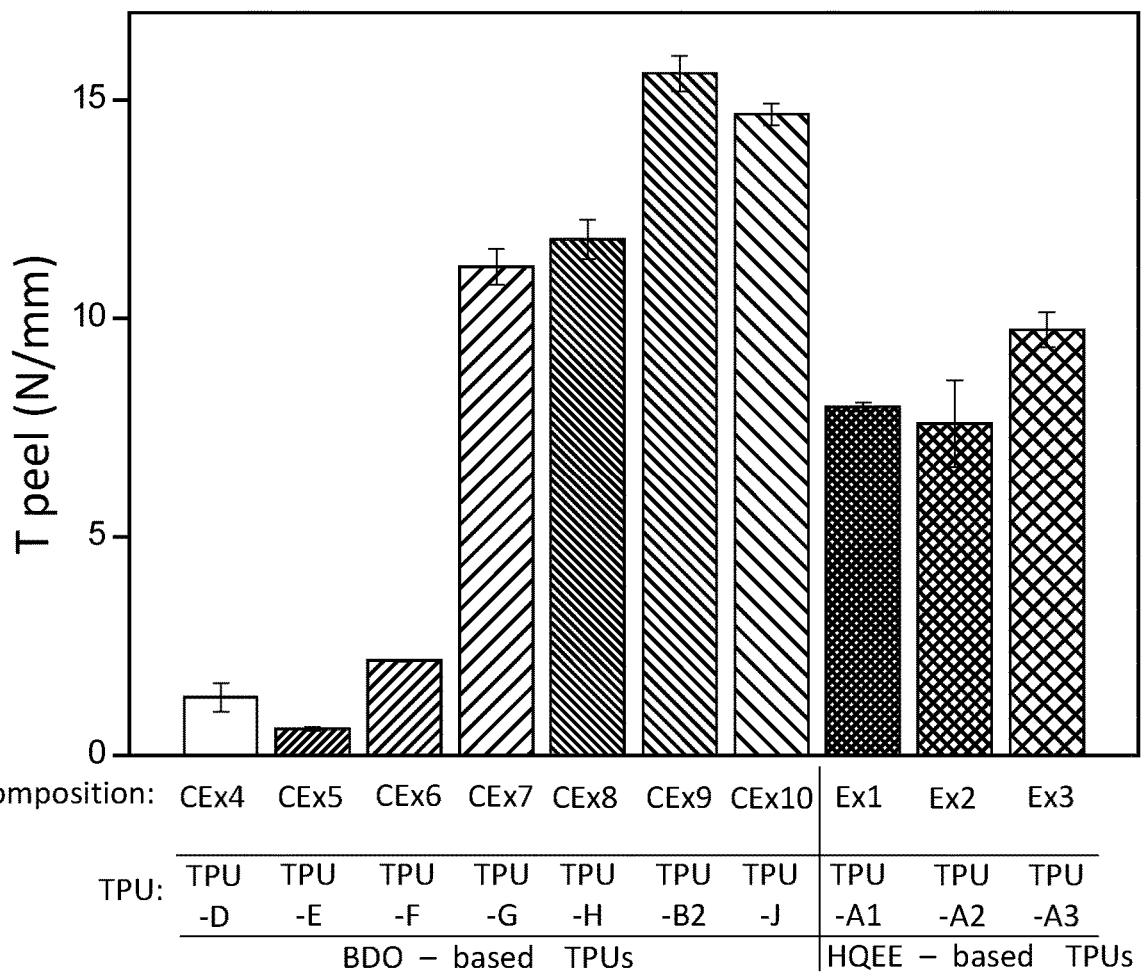
FIG. 6: Bar chart showing the effect of TPUs based on HQEE chain extenders or BDO chain extenders on the T peel performance of cyanoacrylate compositions as a function of cure time. Results are shown for Example Composition 2 (Ex2), Example Composition 3 (Ex3), Comparative Example Composition 2 (CEx2), and Comparative Example Composition 3 (CEx3). Results for two curing conditions are depicted. The first curing condition tested was a 7 day cure at 25° C. The second curing condition tested, was a 3 day cure at 25° C., followed by a 1 day cure at 90° C. (termed an 'accelerated cure'). The TPU present in each composition is provided in FIG. 6 and whether said TPU is BDO-based or HQEE-based is specified.

As seen in FIG. 5, the Example Compositions exhibit strong T peel performance following 24 hour cure at 90° C., on the order of 6 N/mm to 10 N/mm, which is well within the margins of the minimum and maximum values seen for the Comparative Example Compositions. Thus, formulation of cyanoacrylate compositions with HQEE-based TPUs does not adversely impact the T peel performance of the compositions. Further characterisation of Example Compositions Ex2 and Ex3 and Comparative Example Compositions CEx2 and CEx3, revealed a remarkably enhanced T peel performance relative to 7 days cure at room temperature (25° C.), when said compositions are subjected to 'accelerated cure'. Said 'accelerated cure' consists of curing 3 days at 25° C. followed by 1 day at 90° C. (FIG. 6). T peel tests were performed in accordance with ASTM-710/ISO 11339. The enhancement of T peel performance seen in FIG. 6 is suggestive, and indicates that in addition to possessing strong initial bonding strength, the strength of bonding is likely to increase over time, which is a desirable property; for example in adhesives applications. Thus, the Example Compositions, and compositions according to the present invention, are cyanoacrylate compositions that exhibit long term viscosity stability at room temperature, and that exhibit strong T peel performance when cured.

The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:

1. A curable cyanoacrylate composition comprising:
   (i) a cyanoacrylate; and
   (ii) a thermoplastic polyurethane (TPU) having a chain formed from structural units;
wherein at least one of the structural units of the chain of the TPU (ii) has the formula:

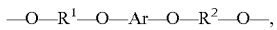

wherein:
   Ar is a $C_6$-$C_{20}$ aromatic group with at least one aromatic ring;
   $R^1$ is a $C_2$-$C_{10}$ alkyl group; and
   $R^2$ is a $C_2$-$C_{10}$ alkyl group,
and wherein the TPU (ii) is present in the curable cyanoacrylate composition from about 1 wt % to about 40 wt %, based on the total weight of the composition.

2. A curable cyanoacrylate composition as claimed in claim 1 wherein the aromatic group Ar in the structural unit with the formula:

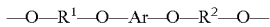

is selected from: benzene, methyl benzene, dimethylbenzene, ethylbenzene, trimethylbenzene, tetramethylbenzene, diethylbenzene, triethylbenzene, naphthalene, methylnaphthalene, dimethylnaphthalene, trimethylnaphthalene, tetraethylbenzene, tetramethylnaphthalene, pentamethylnaphthalene, hexamethylnaphthalene, ethylnaphthalene, diethylnaphthalene, or triethylnaphthalene.

3. A curable cyanoacrylate composition as claimed in claim 1 wherein the aromatic group Ar in the structural unit with the formula:

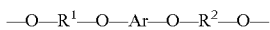

is a benzene group or a naphthalene group.

4. A curable cyanoacrylate composition according to claim 1 wherein at least one of the alkyl groups $R^1$ and $R^2$ in the structural unit with the formula:

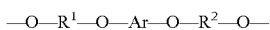

is a C2 alkyl group.

5. A curable cyanoacrylate composition according to claim 1 wherein the alkyl groups $R^1$ and $R^2$ in the structural unit with the formula:

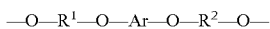

are both C2 alkyl groups.

6. A curable cyanoacrylate composition as claimed in claim 1 wherein the structural unit with the formula:

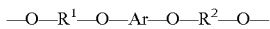

is formed from hydroquinone bis(2-hydroxyethyl) ether (HQEE).

7. A curable cyanoacrylate composition according to claim 1, wherein the structural unit with the formula:

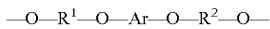

is present in the TPU (ii) in an amount from about 0.5 wt % to about 50 wt %, based on the total weight of the thermoplastic polyurethane (ii).

8. A curable cyanoacrylate composition as claimed in claim 1, wherein the TPU (ii) is prepared using a polyol selected from the group consisting of a polyester-polyol, a co-polyester-polyol, a polyether-polyol, a co-polyether-polyol, a polycaprolactone-polyol, and a co-polycaprolactone-polyol.

9. A curable cyanoacrylate composition as claimed in claim 8, wherein the polyol used in the preparation of the thermoplastic polyurethane (TPU) (ii) is a polyester-polyol or a co-polyester-polyol.

10. A curable cyanoacrylate composition as claimed in claim 9, wherein the polyol used in the preparation of the TPU (ii) is a co-polyester formed from a dicarboxylic acid and 1,6-hexanediol.

11. A curable cyanoacrylate composition as claimed in claim 10 wherein the polyol used in the preparation of the TPU) (ii) is a linear polyester-polyol formed from a dicarboxylic acid and 1,6-hexanediol, and wherein the linear polyester-polyol has a hydroxyl number of from about 1 to about 60 mg KOH/g, as measured according to ASTM E222.

12. A curable cyanoacrylate composition according to claim 1 wherein the cyanoacrylate (i) is selected from the group consisting of ethyl 2-cyanoacrylate and β-methoxycyanoacrylate.

13. A curable cyanoacrylate composition according to claim 1 wherein the cyanoacrylate (i) is present in an amount of about 50 wt % to about 99 wt % based on the total weight of the cyanoacrylate composition.

14. A curable cyanoacrylate composition according to claim 1 wherein the cyanoacrylate (i) is present in an amount of about 60 wt % to about 90 wt % based on the total weight of the cyanoacrylate composition.

15. A curable cyanoacrylate composition according to claim 1 wherein the TPU (ii) is present in an amount of about 1 wt % to about 40 wt % based on the total weight of the cyanoacrylate composition.

16. A curable cyanoacrylate composition according to claim 1 wherein the TPU (ii) is present in an amount of about 5 wt % to about 20 wt % based on the total weight of the cyanoacrylate composition.

17. A curable cyanoacrylate composition according to claim 1 further comprising a stabiliser in an amount from about 0.0005 wt % to about 5 wt % based on the total weight of the cyanoacrylate composition.

18. A curable cyanoacrylate composition according to claim 17 wherein the stabiliser is selected from $BF_3$, $SO_2$, or HF.

19. A curable cyanoacrylate composition according to claim 1 further comprising ultra-high molecular weight polyethylene in an amount from about 0.05 wt % to about 5 wt % based on the total weight of the cyanoacrylate composition.

20. A curable cyanoacrylate composition as claimed in claim 1 wherein the viscosity of the uncured composition as measured at 25° C. does not decrease by greater than 5% from the starting viscosity over 30 days of storage at 25° C.

21. A curable cyanoacrylate composition as claimed in claim 1, wherein the composition further comprises an antioxidant at an amount from about 0.01 wt % to about 1 wt %, by weight based on the total weight of the composition.

22. A curable cyanoacrylate composition as claimed in claim 21, wherein the antioxidant is pentaerythritol tetrakis (3-(3,5-di-tert-butyl-4-hydroxyphenyl)propionate).

23. A method of preparing a curable cyanoacrylate composition that retains a stable viscosity for at least 30 days when stored at 25° C., the viscosity measured at 25° C., wherein the method involves preparing a composition comprising from about 60 wt % to about 90 wt % of a cyanoacrylate with from about 1 wt % to about 40 wt % of a TPU, wherein the percentages are by weight based on the total weight of the composition and wherein the TPU has been prepared from:

a polyol selected from the group consisting of a polyester-polyol, a co-polyester-polyol, a polyether-polyol, a co-polyether-polyol, a polycaprolactone-polyol, and a co-polycaprolactone-polyol; and an isocyanate compound selected from the group consisting of 1,4-diisocyanatobenzene (PPDI), toluene diisocyanate (TDI), 4,4'-diphenylmethane diisocyanate (4,4'-MDI), 2,4'-diphenylmethane diisocyanate (2,4'-MDI), polymethylene poly(phenyl isocyanate) (PMDI), 1,5-naphthalene diisocyanate (NDI), bitolylene diisocyanate (TODI), 1,3-xylene diisocyanate (XDI),p-1,1,4,4-tetramethylxylene diisocyanate (p-TMXI), m-1,1,3,3-tetramethylxylylene diisocyanate (m-TMXDI), 1,6-diisocyanato-2,4,4-trimethylhexane, 1,4-cyclohexane diisocyanate (CHDI), 1,4-cyclohexanebis (methylene isocyanate) (BDI), 1,3-bis(isocyanatomethyl) cyclohexane (H6XDI), 3-isocyanatomethyl-3,5,5-trimethylcyclohexyl isocyanate (IPDI), dicyclohexylmethane diisocyanate (H12MDI), and triphenylmethane -4,4',4"-triisocyanate; and a chain extender with the formula:

HO—R$^1$—O—Ar—O—R$^2$—OH, wherein Ar is a $C_6$-$C_{20}$ aromatic group with at least one ring, $R^1$ is a $C_2$-$C_{10}$ alkyl group, and $R^2$ is a $C_2$-$C_{10}$ alkyl group.

24. The method according to claim 23, wherein the TPU has been prepared from a polyol selected from the group consisting of a polyester-polyol, a co-polyester-polyol, a polyether-polyol, a co-polyether-polyol, a polycaprolactone-polyol, and a co-polycaprolactone-polyol, and an isocyanate compound selected from the group consisting of 1,4-diisocyanatobenzene (PPDI), toluene diisocyanate (TDI), 4,4'-diphenylmethane diisocyanate (4,4'-MDI), 2,4'-diphenylmethane diisocyanate (2,4'-MDI), polymethylene poly(phenyl isocyanate) (PMDI), 1,5-naphthalene diisocyanate (NDI), bitolylene diisocyanate (TODI), 1,3-xylene diisocyanate (XDI),p-1,1,4,4-tetramethylxylene diisocyanate (p-TMXI), m-1,1,3,3-tetramethylxylylene diisocyanate (m-TMXDI), 1,6-diisocyanato-2,4,4-trimethylhexane, 1,4-cyclohexane diisocyanate (CHDI), 1,4-cyclohexanebis (methylene isocyanate) (BDI), 1,3-bis(isocyanatomethyl) cyclohexane (H6XDI), 3-isocyanatomethyl-3,5,5-trimethylcyclohexyl isocyanate (IPDI), dicyclohexylmethane diisocyanate (H12MDI), and triphenylmethane-4,4',4"-triisocyanate, and a chain extender with the formula:
HO—R$^1$—O—Ar—O—R$^2$—OH, wherein said chain extender is hydroquinone bis(2-hydroxyethyl) ether (HQEE).

* * * * *